(12) United States Patent
Bi et al.

(10) Patent No.: US 12,285,751 B2
(45) Date of Patent: Apr. 29, 2025

(54) FLUIDIZED BED REACTOR SYSTEMS AND METHODS FOR TORREFACTION AND CATALYTIC PYROLYSIS OF BIOMASS

(71) Applicant: THE UNIVERSITY OF BRITISH COLUMBIA, Vancouver (CA)

(72) Inventors: Xiaotao Bi, Vancouver (CA); C. Jim Lim, Vancouver (CA); Shahab Sokhansanj, North Vancouver (CA); Jianghong Peng, Richmond (CA); Dening Jia, Vancouver (CA); Ruixu Wang, Vancouver (CA)

(73) Assignee: The University of British Columbia

( * ) Notice: Subject to any disclaimer, the term of this patent is extended or adjusted under 35 U.S.C. 154(b) by 70 days.

(21) Appl. No.: 18/048,308

(22) Filed: Oct. 20, 2022

(65) Prior Publication Data

US 2023/0149875 A1    May 18, 2023

Related U.S. Application Data

(63) Continuation of application No. PCT/CA2020/050546, filed on Apr. 24, 2020.

(51) Int. Cl.
*C10B 19/00* (2006.01)
*B01J 8/18* (2006.01)
(Continued)

(52) U.S. Cl.
CPC ............ *B01J 8/1818* (2013.01); *B01J 8/24* (2013.01); *B01J 8/42* (2013.01); *C10B 19/00* (2013.01);
(Continued)

(58) Field of Classification Search
CPC .... B01J 8/1818; B01J 8/24; B01J 8/42; C10B 19/00; C10B 47/24; C10B 49/10;
(Continued)

(56) References Cited

U.S. PATENT DOCUMENTS 2,511,088 A * 6/1950 Whaley, Jr. ............... C09C 1/60
425/222
4,828,486 A * 5/1989 Sakamoto ................ B01J 8/26
431/170
(Continued)

FOREIGN PATENT DOCUMENTS

CN        102942965 A     2/2013

OTHER PUBLICATIONS

Arias, B. et al., "Influence of torrefaction on the grindability and reactivity of woody biomass", Fuel Process. Technol. 89, 169-175, 2008.
(Continued)

*Primary Examiner* — Jonathan Miller
(74) *Attorney, Agent, or Firm* — Oyen Wiggs Green & Mutala LLP

(57) ABSTRACT

A fluidized bed reactor for biomass treatment comprising a vessel extending in a first direction from a first end to a second end, an inlet at the first end of the vessel for feeding biomass particles into the vessel, an outlet at the second end of the vessel for outputting processed biomass, a first fluid inlet independently activatable to deliver a first volume of a gas in a second direction into a first region of the vessel, and a second fluid inlet spaced apart from the first fluid inlet in the first direction and independently activatable to deliver a second volume of the gas in the second direction into a second region of the vessel, the second region adjacent the first region.

23 Claims, 14 Drawing Sheets

(51) Int. Cl.

| | |
|---|---|
| *B01J 8/24* | (2006.01) |
| *B01J 8/42* | (2006.01) |
| *C10B 47/24* | (2006.01) |
| *C10B 49/10* | (2006.01) |
| *C10L 5/36* | (2006.01) |
| *C10L 5/40* | (2006.01) |
| *C10L 5/44* | (2006.01) |
| *C10L 9/08* | (2006.01) |

(52) U.S. Cl.
CPC .............. *C10B 47/24* (2013.01); *C10B 49/10* (2013.01); *C10L 5/363* (2013.01); *C10L 5/406* (2013.01); *C10L 5/44* (2013.01); *C10L 9/083* (2013.01); *C10L 2290/02* (2013.01); *C10L 2290/06* (2013.01); *C10L 2290/141* (2013.01); *C10L 2290/56* (2013.01)

(58) Field of Classification Search
CPC .. C10L 5/363; C10L 5/406; C10L 5/44; C10L 9/083
See application file for complete search history.

(56) References Cited

U.S. PATENT DOCUMENTS

| | | | | |
|---|---|---|---|---|
| 5,264,196 | A * | 11/1993 | Tanaka | C01G 43/066 |
| | | | | 423/259 |
| 5,364,651 | A | 11/1994 | Manser et al. | |
| 5,510,085 | A * | 4/1996 | Abdulally | F23C 10/26 |
| | | | | 422/142 |
| 8,282,787 | B2 * | 10/2012 | Tucker | C10B 53/00 |
| | | | | 95/114 |
| 8,500,959 | B2 * | 8/2013 | Lehto | F23C 10/04 |
| | | | | 201/31 |
| 8,764,875 | B2 | 7/2014 | Huang et al. | |
| 9,193,916 | B2 * | 11/2015 | Bar-Ziv | C10B 47/44 |
| 9,388,046 | B2 * | 7/2016 | Mennell | C21B 5/007 |
| 9,545,609 | B2 * | 1/2017 | Van Thorre | C10G 1/08 |
| 12,018,835 | B2 * | 6/2024 | Gustavsson | C10J 3/48 |
| 2002/0011328 | A1 * | 1/2002 | Squires | B01J 8/40 |
| | | | | 165/84 |
| 2005/0036940 | A1 * | 2/2005 | Grace | B01J 8/386 |
| | | | | 423/652 |
| 2007/0249887 | A1 * | 10/2007 | Kitamura | B01J 8/382 |
| | | | | 588/320 |
| 2010/0162625 | A1 | 7/2010 | Mills | |
| 2010/0287826 | A1 | 11/2010 | Hoffman et al. | |
| 2011/0219679 | A1 * | 9/2011 | Budarin | C10C 5/00 |
| | | | | 422/186 |
| 2011/0290788 | A1 * | 12/2011 | Klemarewski | C10L 9/083 |
| | | | | 219/678 |
| 2012/0285080 | A1 * | 11/2012 | Despen | C10B 39/02 |
| | | | | 252/502 |
| 2013/0256113 | A1 | 10/2013 | Tumiatti et al. | |
| 2014/0053458 | A1 * | 2/2014 | Bar-Ziv | C10B 57/02 |
| | | | | 44/589 |
| 2015/0217252 | A1 * | 8/2015 | Bucci | B01J 8/44 |
| | | | | 702/29 |
| 2017/0037334 | A1 * | 2/2017 | Mennell | H01B 1/04 |
| 2020/0141570 | A1 * | 5/2020 | Strom | B01J 8/26 |
| 2021/0245130 | A1 * | 8/2021 | Pallares | F23C 10/30 |

OTHER PUBLICATIONS

Bergman, P.C.A. et al., "Torrefaction for entrained-flow gasification of biomass", Energy Research Centre of the Netherlands (ECN), 2005.
Bergman, P.C.A. et al., "Torrefaction for biomass upgrading", In: Proceedings 14th European Biomass Conference and Exhibition, Oct. 17-21, Paris, France, 2005.
Chen, W.H. et al., "A state-of-the-art review of biomass torrefaction, densification and applications", Renewable and Sustainable Energy Reviews 44, 847-866, 2015.
Chen, W.H. et al., "A study on torrefaction of various biomass materials and its impact on lignocellulosic structure simulated by a thermogravimetry", Energy 35, 2580-2586, 2010.
Chen, W.H. et al., "Torrefaction and co-torrefaction characterization of hemicellulose, cellulose and lignin as well as torrefaction of some basic constituents in biomass", Energy 36, 803-811, 2011.
Couhert, C. et al., "Impact of torrefaction on syngas production from wood", Fuel 88, 2286-2290, 2009.
Deng, J. et al., "Pretreatment of agricultural residues for co-gasification via torrefaction", J. Anal. Appl. Pyrol. 86, 331-337, 2009.
Fotovat, F. et al., "Distribution of Large Biomass Particles in a Sand-Biomass Fluidized Bed: Experiments and Modeling", AIChE J 60, 869-880, 2014.
Goransson, K. et al., "An experimental study on catalytic bed materials in a biomass dual fluidised bed gasifier", Renewable Energy 81, 251-261, 2015.
Hannula, I. et al., "A semi-empirical model for pressurised air-blown fluidised-bed gasification of biomass", Bioresour. Technol. 101, 4608-4615, 2010.
Jia D. et al., "Gas-solid mixing and mass transfer in a tapered fluidized bed of biomass with pulsed gas flow", Powder Technol., 316, 373-387, 2017.
Jia, D. et al., "Biomass drying in a pulsed fluidized bed without inert bed particles", Fuel 186, 270-284, 2016.
Jia, D. et al., "Fluidization and drying of biomass particles in a vibrating fluidized bed with pulsed gas flow", Fuel Processing Technology 138, 471-482, 2015.
Li, H. et al., Pelletization of torrefied sawdust and properties of torrefied pellets, Applied Energy, 93, 680-685, 2012.
Li, H. et al., "Torrefaction of sawdust in a fluidized bed reactor", Bioresource Technology, 103, 453-458, 2012.
Magelli, F. et al., "An environmental impact assessment of exported wood pellets from Canada to Europe", Biomass & Bioenergy, 33, 434-441, 2009.
Mohamed, B.A. et al., "The role of tailored biochar in increasing plant growth, and reducing bioavailability, phytotoxicity, and uptake of heavy metals in contaminated soil", Environmental Pollution, 230, 329-338, 2017.
Mohamed, B.A. et al., "Engineered biochar from microwave-assisted catalytic pyrolysis of switchgrass for increasing water-holding capacity and fertility of sandy soil", Sci Total Environ 566, 387-397, 2016.
Mohamed, B.A. et al., "Microwave-assisted catalytic pyrolysis of switchgrass for improving bio-oil and biochar properties", Bioresour Technol 201, 121-132, 2016.
Pa, A., et al., "Development of British Columbia Wood Pellet Life Cycle Inventory and its Utilization in the Evaluation of Domestic Pellet Applications", MASc thesis, UBC, Canada, 2010.
Pattiya, A., "Bio-oil production via fast pyrolysis of biomass residues from cassava plants in a fluidised-bed reactor", Bioresour. Technol. 102, 1959-1967, 2011.
Peng, J. et al., "Sawdust as an effective binder for making torrefied pellets", Applied Energy 157, 491-498, 2015.
Peng, J. et al., "Effects of thermal treatment on energy density and hardness of torrefied wood pellets", Fuel Processing Technology 129, 168-173, 2015.
Peng, J.H. et al., "Study on Density, Hardness and Moisture Uptake of Torrefied Wood Pellets", Energy and Fuels, 27 (2), 967-974, 2013.
Peng, J.H. et al., "A study on particle size effect on torrefaction and densification of pine sawdust", Energy and Fuels, 26(6), 3826-3839, 2012.
Peng, J.H et al., "Development of Torrefaction Kinetics for British Columbia Softwoods", Int. J. Chem. React. Eng., 10 (1), 2012.
Peng J.H. et al., "An Economical and Market Analysis of Canadian Wood Pellets", Int. J. Green Energy, 7, 128-142, 2010.
Phanphanich, M. et al., "Impact of torrefaction on the grindability and fuel characteristics of forest biomass", Bioresour. Technol. 2011, 1246-1253.
Pimchuai, A. et al., "Torrefaction of agriculture residue to enhance combustible properties", Energ. Fuel. 24, 1638-4645, 2010.

(56) References Cited

OTHER PUBLICATIONS

Repellin, V. et al., "Modelling anhydrous weight loss of wood chips during torrefaction in a pilot kiln", Biomass & Bioenergy 34, 602-609, 2010.
Rousset, P. et al., "Characterisation of the torrefaction of beech wood using NIRS: Combined effects of temperature and duration", Biomass & Bioenergy 35, 1219-1226, 2011.
Rozainee, M. et al., "Effect of fluidising velocity on the combustion of rice husk in a bench-scale fluidised bed combustor for the production of amorphous rice husk ash", Bioresour. Technol. 99, 703-713, 2008.
Wang, C.W. et al., "Oxidative torrefaction of biomass residues and densification of torrefied sawdust to Pellets", Biore. Technol., 127, 318-325, 2013.
Yan, W. et al., "Thermal Pretreatment of Lignocellulosic Biomass", Environ. Prog. Sustain. Energy 28, 435-440, 2009.
Zhang, Y. et al., "Experimental investigation on mixing and segregation behavior of biomass particle in fluidized bed", Chem Eng Process 48, 745-754, 2009.
Zhong, W.Q. et al., "Fluidization of Biomass Particles in a Gas-Solid Fluidized Bed", Energy Fuels 22, 4170-4176, 2008.

\* cited by examiner

FLUIDIZED BED REACTOR SYSTEMS AND METHODS FOR TORREFACTION AND CATALYTIC PYROLYSIS OF BIOMASS

CROSS-REFERENCE TO RELATED APPLICATION

This application is a continuation of PCT international patent application No. PCT/CA2020/050546 filed 24 Apr. 2020 entitled FLUIDIZED BED REACTOR SYSTEMS AND METHODS FOR TORREFACTION AND CATALYTIC PYROLYSIS OF BIOMASS which is hereby incorporated herein by reference for all purposes.

TECHNICAL FIELD

This application relates to fluidized bed reactors for processing biomass and to methods and systems for biomass processing. Some embodiments are operative to perform torrefaction or pyrolysis of biomass.

BACKGROUND

Biomass is a promising source of renewable energy. However, the energy density of raw biomass may be undesirably low. Processes such as pyrolysis or torrefaction may be employed to increase the energy density of biomass and/or to convert biomass into other forms that may be useful for specific purposes. 'Pyrolysis' of biomass refers to chemical decomposition of biomass under limited oxygen levels or in total absence of oxygen under elevated temperatures. Reaction temperatures for pyrolysis are typically in the range of about 300° C. to about 650° C. A milder process, often referred as 'torrefaction', typically involves subjecting biomass to temperatures in the range of about 200° C. to about 300° C.

Products of biomass pyrolysis may include liquids (e.g. bio-oil), gases (e.g. bio-oil vapour and/or non-condensable gases) and/or solids (e.g. bio-char). Bio-oil is sometimes referred to as tar or bio-crude. Bio-oil typically has higher energy density than its parent biomass material, which facilitates storage and transportation.

One of the major challenges in developing processes for treating biomass (e.g. by torrefaction or pyrolysis) is providing a cost-effective reactor that matches the capacity of available equipment for drying, grinding and pelleting biomass. Previously proposed torrefaction reactors include fixed beds, moving beds or screw types. These reactors commonly employ wood chips as feedstock. These reactors require large footprints due to the at least 40 to 60 minutes of residence time required by these reactors to perform torrefaction and/or pyrolysis.

Employing fluidized beds for processing biomass has also been proposed. However, fluidization of biomass is complicated by the fact that biomass particles tend to clump together. The poor flowability and high cohesiveness of biomass particles can cause undesirable phenomena such as channeling, bypassing and defluidization in biomass fluidized beds. One can add inert solid bed particles such as sand or calcite to mix with biomass in a fluidized bed such that gas-solid flow is stabilized. However, a disadvantage of such a strategy is that fine powders of the bed particles are produced during fluidization. These fine particles may undesirably adhere to the biomass particles and be included in subsequent biomass products. In the case of torrefaction and pyrolysis where thermal-treated biomass solids will later be utilized as a biofuel or feedstock, the increased ash content can reduce product quality and/or harm downstream equipment.

The quality of torrefied or pyrolyzed biomass product is also determined by the uniformity of the processing. In conventional fluidized beds of the type where particles are fed continuously into a reactor and discharged continuously from the reactor, particles are vigorously mixed, resulting in a broad distribution of residence time for different particles. This variation in residence times yields non-uniform product in which some particles are over-reacted and some particles are under-reacted.

There is a general need for apparatus and methods for processing biomass which are efficient in operation and cost effective.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a fluidized bed reactor for treatment of particles. The reactor comprises a vessel extending in a first direction from a first end to a second end, an inlet at the first end of the vessel for feeding particles into the vessel, an outlet at the second end of the vessel for outputting processed particles, a first fluid inlet independently activatable to deliver a first volume of a gas in a second direction into a first region of the vessel, a second fluid inlet spaced apart from the first fluid inlet in the first direction and independently activatable to deliver a second volume of the gas in the second direction into a second region of the vessel, the second region adjacent the first region.

In some embodiments, the particles comprise biomass particles. In some embodiments, the particles comprise polymer particles. In some embodiments, the particles comprise a mixture of biomass and polymer particles.

In some embodiments, the first direction is non-parallel to the second direction. In some embodiments, the first direction is orthogonal to the second direction.

In some embodiments, the first volume of the gas is heated and the second volume of the gas is heated. In some embodiments, the first volume of the gas is heated to a temperature, T1, and the second volume of the gas is heated to a temperature, T2, and T2 is greater than T1. In some embodiments, the first volume of the gas is heated to a temperature, T1, and the second volume of the gas is heated to a temperature, T2, and T2 is approximately equal to T1.

In some embodiments, the first volume of the gas is delivered into the vessel through a first plenum chamber and the second volume of the gas is delivered into the vessel through a second plenum chamber and the first and second plenum chambers are spaced apart and separated. In some embodiments, the first volume of the gas and the second volume of the gas are provided from a single fluid source.

In some embodiments, the vessel is divided into a first zone and a second zone and wherein one or more magnetrons produce microwaves in the second zone.

In some embodiments, first and second sidewalls of the vessel extend in the first direction and are each sloped downward toward one another.

In some embodiments, a bottom wall of the vessel is perforated to allow gas delivered by the first fluid inlet and the second fluid inlet to pass through perforations in the bottom wall into the vessel.

In some embodiments, the reactor comprises a third fluid inlet spaced apart from the second fluid inlet in the first direction and independently activatable to deliver a third volume of the gas in the second direction into a third region of the vessel, the third region adjacent the second region. In some embodiments, the reactor comprises a fourth fluid inlet spaced apart from the third fluid inlet in the first direction and independently activatable to deliver a fourth volume of the gas in the second direction into a fourth region of the vessel, the fourth region adjacent the third region. In some embodiments, the reactor comprises a fifth fluid inlet spaced apart from the fourth fluid inlet in the first direction and independently activatable to deliver a fifth volume of the gas in the second direction into a fifth region of the vessel, the fifth region adjacent the fourth region.

In some embodiments, the reactor comprises a pressurized fluid source. In some embodiments, the first fluid inlet comprises a first piston selectively operable to open a first seal between the pressurized fluid source and the vessel to thereby deliver the first volume of the gas in the second direction into first region of the vessel. In some embodiments, the second fluid inlet comprises a second piston selectively operable to open a second seal between the pressurized fluid source and the vessel to thereby deliver the second volume of the gas in the second direction into the second region of the vessel.

In some embodiments, the reactor comprises a vibrating apparatus for vibrating the vessel.

In some embodiments, the reactor comprises one or more direct heaters for heating the particles.

In some embodiments, the polymer particles comprise one or more of polyethylene, polypropylene and rubber.

In some embodiments, the particles comprises greater than 90% biomass particles by weight. In some embodiments, the composition of the particles comprises between 20% and 90% biomass particles by weight and between 10% and 80% polymer particles by weight. In some embodiments, the composition of the particles comprises between 70% and 90% biomass particles by weight and between 10% and 30% polymer particles by weight. In some embodiments, the composition of the particles comprises less than 10% biomass particles by weight.

Another aspect of the invention provides a method of processing particles in a fluidized bed reactor. The method comprises feeding particles through a vessel of the reactor in a first direction, propagating fluidization waves in the first direction inside the vessel and heating the particles.

In some embodiments, the particles comprise biomass particles. In some embodiments, the particles comprise polymer particles. In some embodiments, the particles comprise a mixture of biomass and polymer particles.

In some embodiments, propagating the fluidization waves in the first direction inside the vessel comprises delivering gas into the vessel in a second direction.

In some embodiments, the first direction is non-parallel to the second direction. In some embodiments, the first direction is orthogonal to the second direction.

In some embodiments, propagating the fluidization waves comprises repeatedly delivering a first volume of the gas into a first region of the vessel in the second direction to fluidize particles in the first region of the vessel and delivering a second volume of the gas into a second region of the vessel in the second direction to fluidize particles in the second region of the vessel, the second region of the vessel adjacent to the first region of the vessel.

In some embodiments, propagating the fluidization waves comprises repeatedly delivering a first volume of the gas into a first region of the vessel in the second direction to fluidize particles in the first region of the vessel, delivering a second volume of the gas into a second region of the vessel in the second direction to fluidize particles in the second region of the vessel, the second region of the vessel adjacent to the first region of the vessel and delivering a third volume of the gas into a third region of the vessel in the second direction to fluidize particles in the third region of the vessel, the third region of the vessel adjacent to the second region of the vessel.

In some embodiments, delivering the second volume of the gas occurs concurrently with delivering the first volume of the gas. In some embodiments, delivering the second volume of the gas occurs after delivering the first volume of the gas. In some embodiments, delivering the second volume of the gas at least partially overlaps temporally with delivering the first volume of the gas. In some embodiments, delivering the third volume of the gas occurs concurrently with delivering the first volume of the gas.

In some embodiments, each of the fluidization waves comprises a wave region of particles at least temporarily having a relatively lower packing density than a rest of a bed of particles within the reactor and wherein each wave region travels in the first direction.

In some embodiments, heating the biomass comprises directly heating the biomass. In some embodiments, heating the biomass comprises indirectly heating the biomass. In some embodiments, heating the biomass comprises convectively transferring heat from the gas to the biomass.

In some embodiments, the method comprises heating the gas to 500° C. or higher.

In some embodiments, heating the biomass comprises convectively transferring heat from the gas to the biomass in a first zone of the vessel and microwaving the biomass in a second zone of the vessel.

In some embodiments, delivering the first volume of the gas in the second direction into the first region comprises operating a first piston to open a first seal between a pressurized fluid source and the first region of the vessel to allow the gas into the first region of the vessel. In some embodiments, delivering the second volume of the gas in the second direction into the second region of the vessel comprises operating a second piston to open a second seal between the pressurized fluid source and the second region of the vessel to allow the gas into the second region of the vessel.

In some embodiments, the particles comprises greater than 90% biomass particles by weight. In some embodiments, the composition of the particles comprises between 20% and 90% biomass particles by weight and between 10% and 80% polymer particles by weight. In some embodiments, the composition of the particles comprises between 70% and 90% biomass particles by weight and between 10% and 30% polymer particles by weight. In some embodiments, the composition of the particles comprises less than 10% biomass particles by weight.

Another aspect of the invention provides a system for processing biomass. The system comprises a dryer for drying raw biomass, a grinder for making biomass particles from dried biomass, a fluidized bed reactor as described herein for processing the biomass particles, a conditioner for adjusting a humidity of processed biomass received from the fluidized bed reactor, a pelletizer for fabricating biomass pellets out of processed biomass received from the conditioner and a cooler for reducing the temperature of the biomass pellets.

In some embodiments, off-gasses from the fluidized bed reactor are combusted to heat the raw biomass in the dryer. In some embodiments, off-gasses from the fluidized bed reactor are combusted to heat the biomass particles in the fluidized bed reactor.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides fluidized bed reactors useful for biomass treatment (e.g. torrefaction and/or pyrolysis), polymer treatment (e.g. pyrolysis) and/or treatment of mixtures of biomass and polymers (e.g. pyrolysis). An example reactor comprises a vessel extending in a first direction from a first end to a second end. An inlet for feeding particles into the vessel is provided at the first end of the vessel. One or more outlets for outputting products is provided at the second end of the vessel.

In operation, a fluidized bed of particles is created in the vessel by introducing an upwardly-flowing gas into the vessel. The particles are heated to a temperature sufficient for torrefaction or pyrolysis.

A controlled atmosphere is maintained in the vessel. For example, the atmosphere may have an oxygen content that is significantly reduced as compared to air. The pressure in the vessel may be at or near atmospheric pressure. For example, in some embodiments, the pressure inside the vessel is approximately 1 atm or a slight vacuum. The pressure within the vessel may be controlled by, for example, an induction fan (or similar apparatuses).

The heated particles migrate in the first direction along the vessel. Solids resulting from the treatment of the particles in the vessel (e.g. torrefied biomass, bio-char, char, etc.) exit the vessel at the outlet. Volatile material(s) released from the particles can be collected at one or more vents. In some embodiments some of the volatile materials are reacted (e.g. oxidized) in-situ or ex-situ to generate heat for heating the particles in the vessel.

In some embodiments, the flow of gas is separately controlled in plural regions spaced apart in a direction between the first and second ends of the reactor. For example, the reactor may include a first fluid inlet activatable to control delivery of a first flow of the gas in a second direction into a first region of the vessel, and a second fluid inlet spaced apart from the first fluid inlet in the first direction and activatable to deliver a second flow of the gas in the second direction into a second region of the vessel that is adjacent to the first region.

Separate control over the flow of gas in different regions may be applied in ways that help to maintain a flow of the particles in the first direction and/or help to break up clumps of the particles as described herein.

Figure 1:
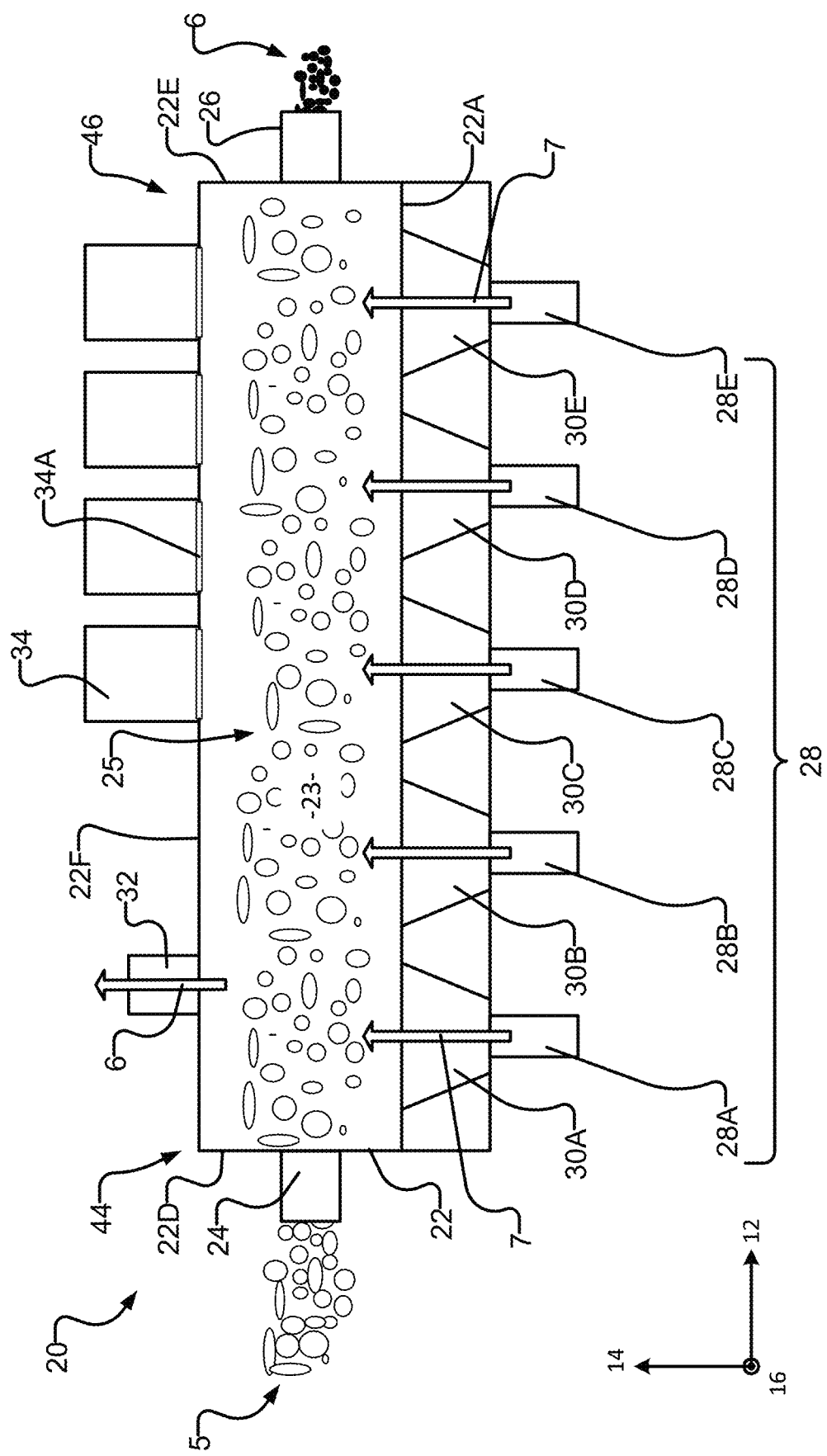
FIG. 1 is a schematic side view cross-section of a reactor according to an exemplary embodiment of the invention.

FIG. 1 is a schematic cross-section of an example fluidized bed reactor 20 which may be employed for biomass treatment. For example, reactor 20 may be employed for torrefaction and/or pyrolysis of particles 5, as desired.

Particles 5 may comprise biomass particles derived from any non-fossilized and biodegradable organic material originating from plants, animals and/or micro-organisms. Biomass particles may include, but are not limited to, products, by-products, residues and waste from agriculture, forestry and related industries as well as the non-fossilized and biodegradable organic fractions of industrial and municipal wastes. Specific non-limiting examples of particles 5 are particles of trees (tree particles may include particles of wood, bark, leaves, needles, cones, etc. from trees such as but not limited to Douglas fir, pine, etc.), particles of grasses (e.g. switchgrass), particles of crop residue (e.g. wheat straw, corn stover, etc.). Particles 5 may comprise particles derived from polymers. Such polymers may include, but are not limited to, products, by-products, residues and waste including municipal waste and recycling. Specific non-limiting examples of polymers include polyethylene, polypropylene, polyethylene terephthalate, polyvinyl chloride, polystyrene, rubbers, etc. Particles 5 may comprise a mixture of biomass particles and polymer particles.

In some embodiments, a composition of particles 5 comprises greater than 90% biomass particles by weight. In some embodiments, a composition of particles 5 comprises greater than 95% biomass particles by weight. In some embodiments, a composition of particles 5 comprises between about 20% and 90% biomass particles by weight and between about 10% and 80% polymer particles by weight. In some embodiments, a composition of particles 5 comprises between about 70% and 90% biomass particles by weight and between about 10% and 30% polymer particles by weight. In some embodiments, a composition of particles 5 comprises greater than 90% polymer particles by weight. In some embodiments, a composition of particles 5 comprises greater than 95% polymer particles by weight.

In some embodiments, particles 5 have a largest dimension in the range of about 0.1 mm to about 4 mm. In some embodiments, particles 5 have a largest dimension of less than 3 mm. In some embodiments, particles 5 have a largest dimension of less than 1.5 mm. Ideally particles 5 are similar in size. For example, in some embodiments, particles 5 have a Sauter mean diameter of between 0.5 mm and 1 mm. In some embodiments, particles 5 are size sorted (e.g. by screening) before they are introduced into reactor 20 to remove particles having dimensions greater than a threshold size (e.g. 3 mm).

In some embodiments, particles 5 are roundish in shape (i.e. dimensions of the particles are similar in three orthogonal directions where one of the dimensions is the longest dimension of the particle). In some embodiments, it is preferred for particles 5 to not have one dimension significantly longer than others (e.g. as in a particle having a needle-like shape).

In some embodiments, particles 5 are pre-treated before being fed into reactor 20, as discussed further herein. Pre-treatment may include, for example, steps for one or more of drying, grinding, sizing, sorting, etc. For example, pre-treatment may be employed to remove undesirable particles or fragments such as, for example, metal particles or fragments.

Figure 2:
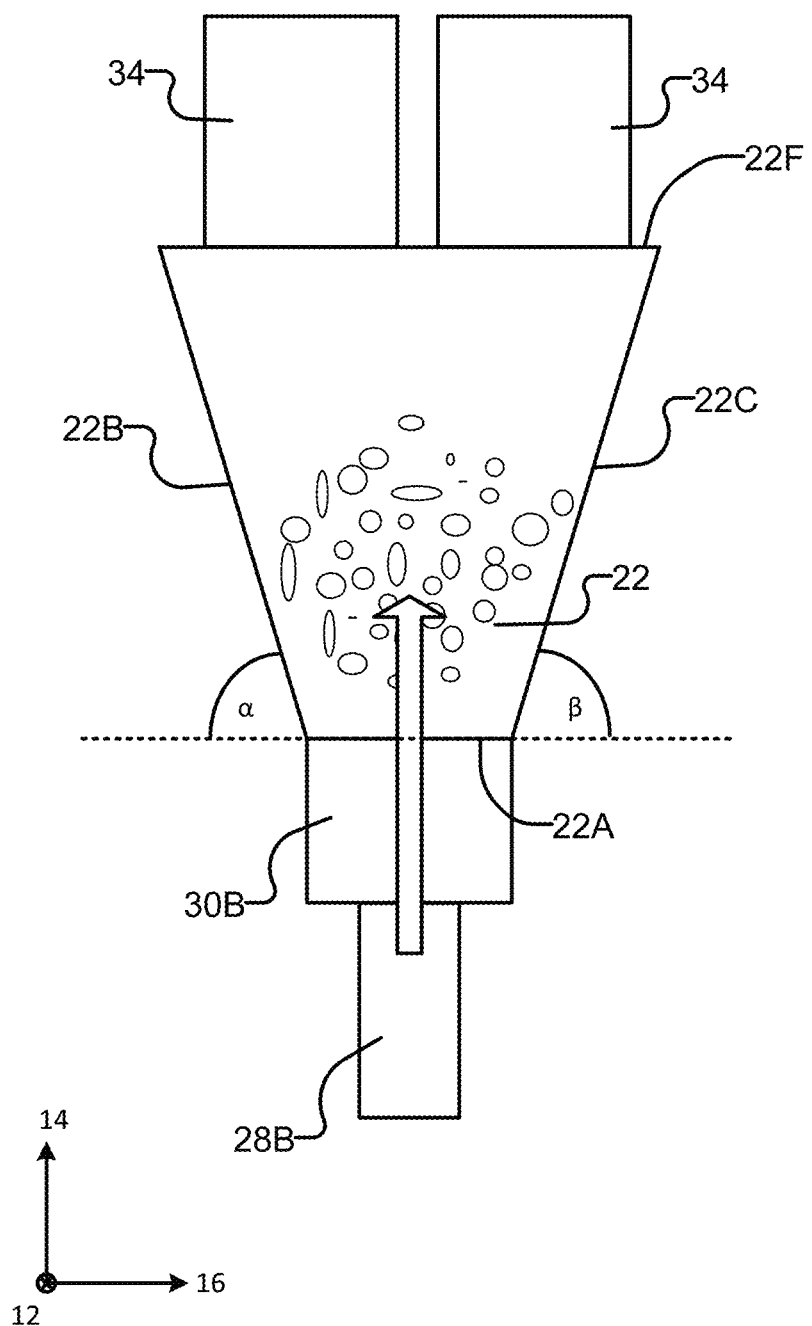
FIG. 2 is a schematic front view cross-section of the reactor of FIG. 1.

Reactor 20 comprises a vessel 22 defined by a bottom wall 22A, a first sidewall 22B, a second sidewall 22C, a first endwall 22D, a second endwall 22E and a top wall 22F (see FIGS. 1 and 2). An interior chamber 23 of vessel 22 extends in a first direction 12.

A particle inlet 24 is provided for feeding particles 5 into vessel 22. Particles 5 may progress from inlet 24 through vessel 22 along a path extending in first direction 12. Particle inlet 24 is located at or near first endwall 22D and provides a route for introducing particles into vessel 22. Particles 5 may be fed into biomass inlet 24 by, for example, a screw feeder.

Outlet 26 is located at or near second endwall 22E and provides a route by way of solid and/or liquid output 6 (e.g. torrefied biomass, pyrolyzed biomass, biochar, char, etc.) may be outputted from reactor 20. In some embodiments, solid and or liquid output 6 may accumulate at second end 46 until solid and or liquid output 6 overflows through outlet 26. In some embodiments, such as, for example, where substantially all of particles 5 may be expected to be vapourized upon pyrolysis, outlet 26 may be omitted and output 6 may be removed through fluid outlet(s) 32.

Fluid outlet(s) 32 may be provided to withdraw gases from an upper part of vessel 22 (e.g. outlet(s) 32 may extend through top wall 22F and/or an upper portion of a side or end wall). Outlets 32 are connected to provide a route for removing fluid output 6 from vessel 22. While outlet 32 is depicted in FIG. 1 as being near first end 44, this is not mandatory and one or more outlets could additional or alternatively be provided near second end 46.

As particles 5 progress through reactor 20, particles 5 are fluidized by the introduction of a fluidization medium 7 into chamber 23. In the illustrated embodiment, a plurality of fluid inlets 28 are arranged to deliver fluidization medium 7 into chamber 23 in a generally upward direction. In general, fluidization medium 7 may be delivered into vessel 22 in a second direction 14. Second direction 14 may be non-parallel to first direction 12. Second direction 14 may be orthogonal to first direction 12.

Advantageously chamber 23 is elongated in direction 12. In some embodiments, a length of chamber 23 along direction 12 is at least 3 or at least 5 times greater than a width of chamber 23. In some embodiments, the length of chamber 23 in first direction 12 is in the range of about 25 cm to 10 m. In some embodiments the width of bed 25 (e.g. the width of a lower portion of chamber 23 in third direction 16) is in the range of about 8 cm to 2 m.

To increase capacity of reactor 20, the width (in third direction 16) of chamber 23 and/or the length (in first direction 12) can be increased. To increase residence time or increase a severity of the reaction, the length (in first direction 12) of chamber 23 may be increased or the rate at which particles 5 are fed into reactor 20 may be decreased. In some embodiments, the height of bed 25 is independent of the length and/or width of bed 25. In some embodiments, it is desirable to maintain the height of bed 25 generally below 10 cm (except for fluctuations in height due to bubbles and/or waves).

In one non-limiting embodiment, reactor 20 has a capacity to process about 20 kg/h of particles 5, the width (in third direction 16) of chamber 23 is approximately 15 cm, the length (in first direction 12) of chamber 23 is approximately 100 cm and the height (in second direction 14) of bed 25 (bed 25 described in more detail herein) is approximately 10 cm or less. In another non-limiting embodiment, reactor 20 has a capacity to process about 2 kg/h of particles 5, the width (in third direction 16) of chamber 23 is approximately 10 cm, the length (in first direction 12) of chamber 23 is approximately 25 cm and the height (in second direction 14) of bed 25 is approximately 10 cm or less.

In some embodiments, chamber 23 may be tapered along first direction 12. For example, a third direction 16 width of chamber 23 at first end 44 may be greater than a third direction 16 width of chamber 23 at second end 46. Such a tapering may be beneficial in maintaining a uniform horizontal flow rate of particles 5 in first direction 12 despite the volume and/or mass of biomass 5 decreasing as it travels in first direction 12 toward second end 46.

In some embodiments, bottom wall 22A may be sloped. For example, first end 44 or bottom wall 22A may be arranged to be higher than second end 46 of bottom wall 22A to encourage movement of particles 5 from first end 44 to second end 46 due to gravity. In other embodiments, first end 44 or bottom wall 22A may be arranged to be lower than second end 46 of bottom wall 22A to achieve a desired residence time of particles 5.

First and second sidewalls 22B, 22C of vessel 22 may be formed to diverge. This can advantageously limit the depth of bed 25 in chamber 23. As fluidization medium 7 streams upward in chamber 23, the cross-sectional area available for the flow of fluidization medium 7 increases and consequently the flow velocity of fluidization medium 7 decreases. When the flow velocity of fluidization medium 7 is low enough, the force of gravity on particles 5 exceeds the lift provided by the flow of fluidization medium 7 thereby causing particles 5 to fall which in turn limits the depth of bed 25 and prevents particles from being entrained out of chamber 23 by fluidization medium 7.

Figure 3B:
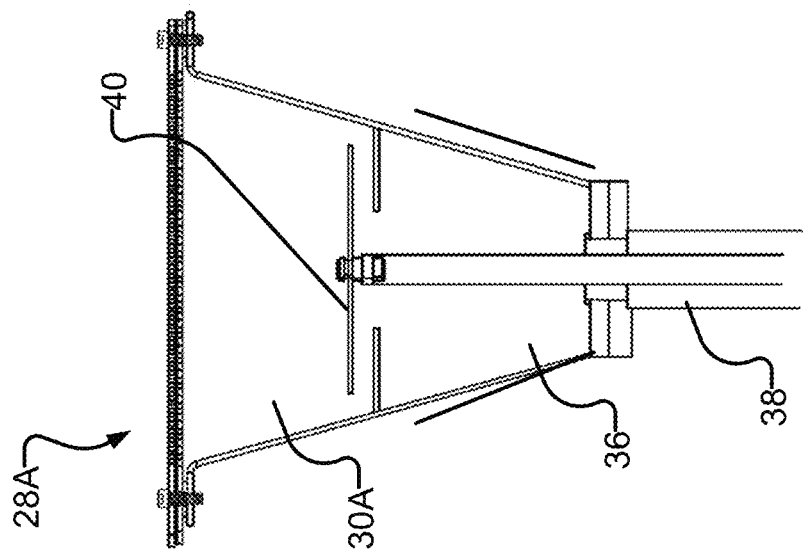
FIG. 3B is a schematic front view cross-section of one of the fluid inlets of FIG. 3A.
Figure 3A:
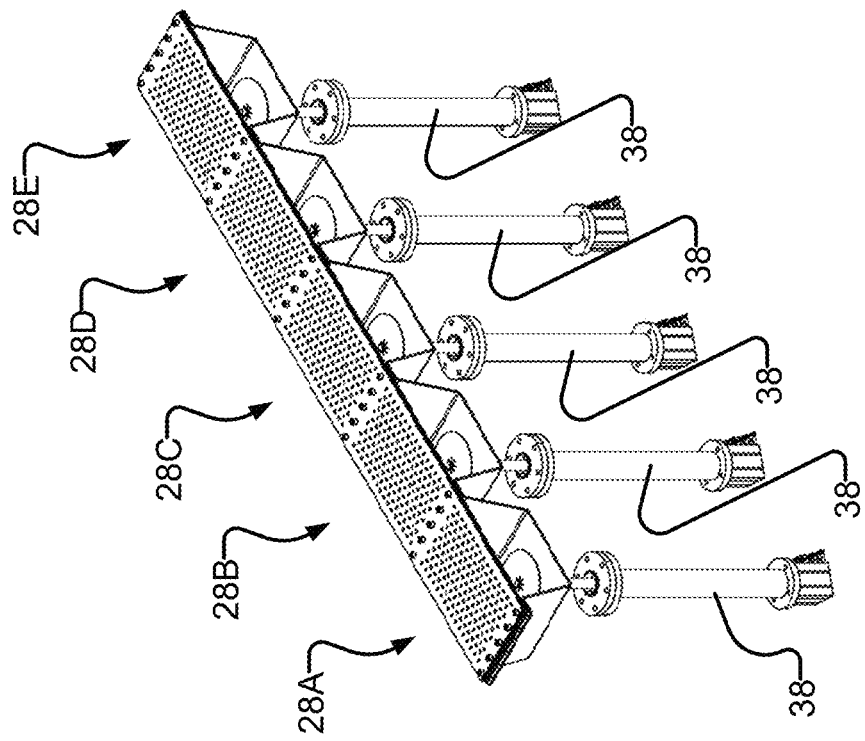
FIG. 3A is a schematic perspective view of a plurality of fluid inlets for a reactor according to an exemplary embodiment of the invention.
Figure 3C:
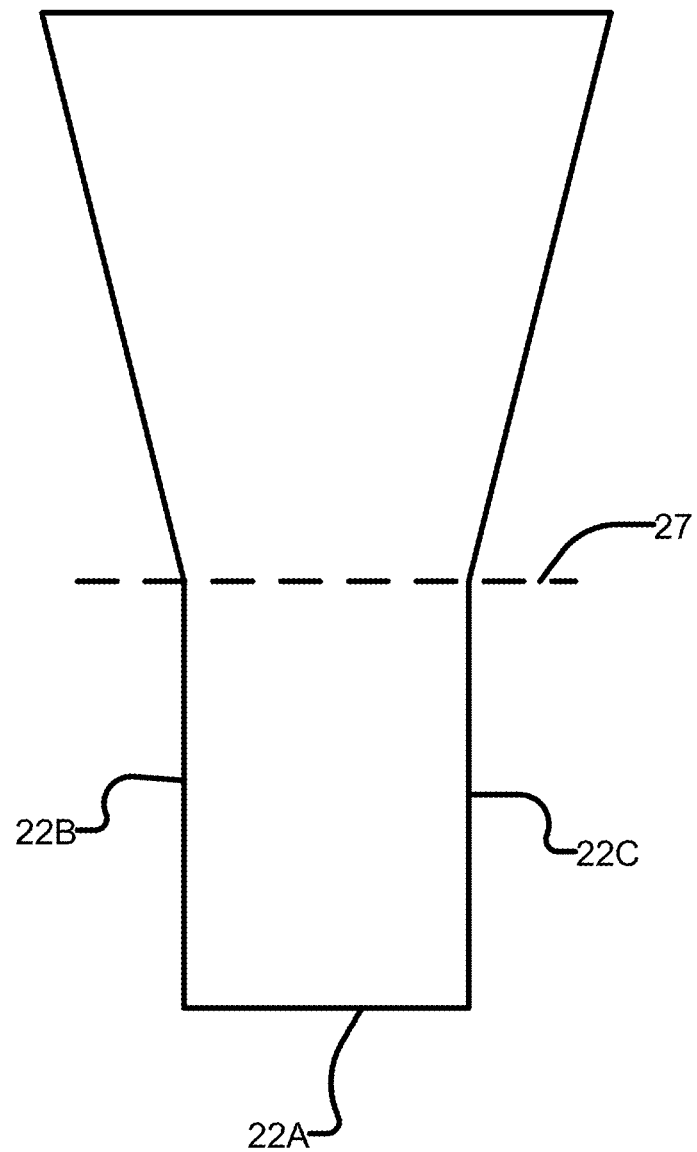
FIG. 3C is a schematic front view cross-section of a reactor according to an exemplary embodiment of the invention.

In some embodiments, as illustrated schematically in FIG. 3C, first and second sidewalls 22B, 22C are formed so that they are generally vertical up to a first elevation 27 above bottom wall 22A and then diverge from one another above the first elevation. With this construction and suitable choice of flow of fluidization medium 7, the top of bed 25 can be maintained to be near first elevation 27.

First and second sidewalls 22B, 22C may be formed to diverge so that particles 5 that alight on non-vertical parts of sidewalls 22B, 22C fall back toward bottom wall 22A and not accrete on first or second sidewalls 22B, 22C. For example, first and second sidewalls 22B, 22C may be sloped such that when reactor 20 is installed, first and second sidewalls are arranged at angles, a, B with respect to the horizontal, where a and B are each in the range of about 30° to about 80°, as shown, for example, in FIG. 2.

Providing first and second sidewalls 22B, 22C that diverge can advantageously allow a higher velocity of fluidization medium 7 within bed 25 as compared to in a vessel having parallel vertical side walls. The higher velocity of fluidization medium may in turn improve heat transfer to particles 5 and mass transfer of particles 5 in first direction 12.

Inside chamber 23, particles 5 may form a bed 25. Bed 25 is a volume within vessel 22 defined in shape and size by the presence of particles 5. Preferably bed 25 is located in a lower portion of chamber 23 (i.e. there is an elevation within chamber 23 above which, in normal operation, there are few or no particles 5.

The volume and shape of bed 25 may change as more particles 5 are fed into vessel 22 or as the packing density of particles 5 changes. For example, the size of bed 25 may increase as the packing density of particles 5 within all or a portion of vessel 22 decreases. A decrease in packing density of particles 5 may, for example, be caused by increasing a flow of fluidization medium 7, thereby raising an elevation of the top of bed 25. Conversely, an increase in packing density of particles 5 may be caused by reducing a flow of fluidization medium 7, thereby causing an elevation of the top of bed 25 to be lowered. The volume of bed 25 may also be affected by adjusting a rate at which particles 5 are fed into reactor 22.

The elevation of the top of bed 25 may be relatively constant or may change along the length of vessel 22. For example, bed 25 height may change as one gets closer to second end 46 due to a reduction in size of individual particles 5 and/or a reduction of density of particles 5 due to drying and/or torrefaction and/or pyrolysis. Bubbles and/or waves which result from delivery of fluidization medium 7 may cause localized variations in the height of bed 25 by between approximately 10% and 30%.

As compared to traditional fluidized bed reactors, bed 25 may be relatively shallow. For example, bed 25 may be maintained with a height (in second direction 14) of 30 cm or less, 17 cm or less, or even 10 cm or less. Such a shallow design may improve the efficacy of fluidization medium 7 to fluidize particles 5 in bed 25 and/or may reduce undesirable rearward travel (e.g. back mixing) of particles 5.

The contents of reactor 20 may be heated by heating fluidization medium 7. Additional mechanisms for heating reactor 20 may optionally be provided. Additional heating mechanisms may be particularly useful for bringing particles 5 to temperatures required for pyrolysis.

For example, in some embodiments, reactor 20 comprises one or more direct heaters (not depicted). Such direct heaters may be provided on or within the walls of vessel 22. Such direct heaters may also or alternatively be provided to heat the walls of vessel 22. Such direct heaters could comprise heat exchange tubes or the like. In some embodiments, heat exchange tubes or the like may be immersed in bed 25.

As another example of an additional heating mechanism, reactor 20 may comprise a mechanism for microwave heating of contents of reactor 20. For example, one or more magnetrons 34 may be provided to heat particles 5 as they travel through vessel 22. For example, in some embodiments, magnetrons 34 are employed for microwave-assisted pyrolysis. Magnetrons 34 may comprise any suitable type of magnetrons such as, for example, negative resistance magnetrons, cyclotron frequency magnetrons and travelling wave or cavity magnetrons. In some embodiments magnetrons 34 may be concentrated toward second end 46 of reactor 20 where particles 5 have reached higher temperatures and pyrolysis reactions are taking place and not relatively closer to first end 44 where particles 5 may not yet have reached temperatures where pyrolysis reactions are occurring.

In some embodiments, one or more windows 34A (as shown, for example, in FIG. 1) may be provided to allow microwaves from magnetrons 34 to pass into chamber 23. Windows 34A may comprise glass or quartz. In some embodiments, at least a portion of top wall 22F may comprise a material that allows microwaves to pass from magnetrons 34 into chamber 23.

In cases where microwave heating is used, particles of a suitable microwave catalyst (also referred to herein as absorbent) may be mixed with particles 5. The microwave catalyst may be a material that absorbs microwave energy and becomes hot. In the fluidized bed heat is transferred from the particles of microwave catalyst to particles 5. The catalyst may decompose organic vapours generated from biomass cracking. As described elsewhere herein, appropriate selection of a microwave catalyst material may enhance the value of products output by reactor 20.

Bottom wall 22A may include openings such as slits, perforations or the like to allow fluidization medium 7 to be delivered into vessel 22 from beneath particles 5. FIG. 3A shows an example in which perforations in bottom wall 22A allow the flow of fluidization medium 7 from fluid inlets 28 into chamber 23. In some embodiments, the perforations of bottom wall 22A cover in the range of about 1% to about 10% of the surface area of bottom wall 22A. Bottom wall 22A may also serve to prevent or hinder particles 5 from leaving vessel 22 undesirably. Bottom wall 22A may comprise a perforated sandwiched distributor, one or more nozzles, bubble caps and/or the like to distribute fluidization medium 7 into chamber 23.

Figure 3D:
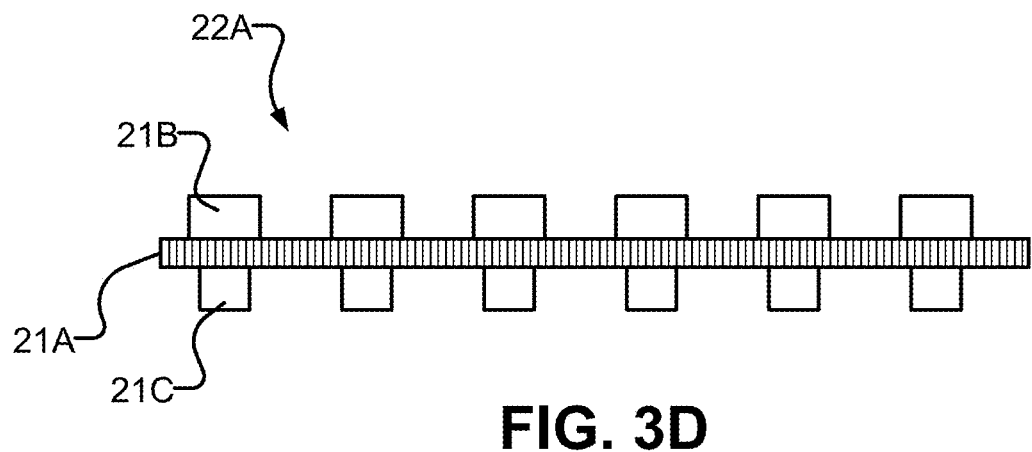
FIG. 3D is a schematic partial side view cross-section of a bottom wall of the reactor according to an exemplary embodiment of the invention.
Figure 3E:
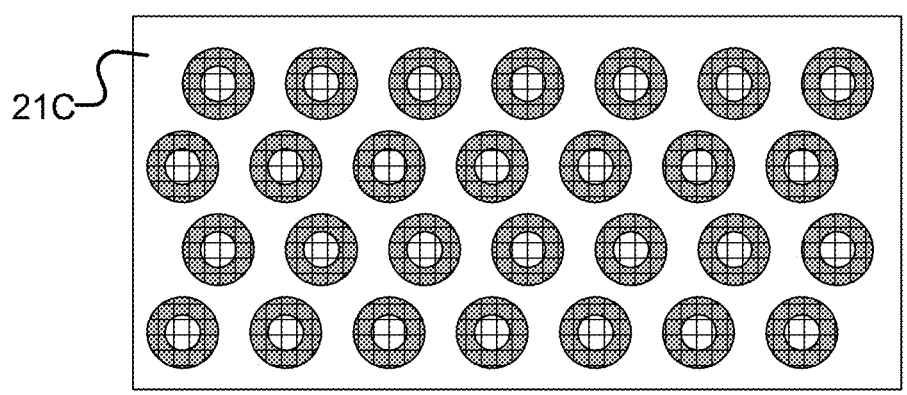
FIG. 3E is a schematic bottom view of the bottom wall of FIG. 3D.

FIGS. 3D and 3E are schematic depictions of a portion of a bottom wall 22A comprising an exemplary perforated sandwiched distributor according to one embodiment of the invention. In the illustrated embodiment, bottom wall 22A comprises three layers: a mesh screen 21A, a first perforated support sheet 21B and a second perforated support sheet 21C.

Apertures of mesh screen 21A may be sufficiently small to prevent particles 5 from passing through. Mesh screen 21A may be a metal mesh screen. First and second perforated support sheets 21B, 21C may provide structural support to mesh screen 21A. First and second perforated support sheets 21B, 21C may reduce damage to mesh screen 21A. First and second perforated support sheets 21B, 21C may channel fluidization medium 7 through mesh screen 21A.

As can be seen from FIGS. 3D and 3E, the perforations in second support sheet 21C may be larger than the perforations in first support sheet 21B. This may facilitate alignment of first and second perforated support sheets 21B, 21C. The size and number of perforations in first and second perforated support sheets 21B, 21C may be chosen to facilitate fluidization of the selected particles 5. For example, for larger or heavier particles 5, the perforations may be smaller to thereby increase the velocity of fluidization medium 7. However, the pressure drop across bottom wall 22A should not be so great as to prevent or impede the pulsation of gas flow.

A plurality of fluid inlets 28 may be arranged to deliver fluidization medium 7 into chamber 23 of vessel 22 and bed 25. In some embodiments, fluid inlets 28 are arranged to deliver fluidization medium 7 into vessel 22 and bed 25 substantially (e.g. within +/−20°) of vertical in second direction 14 as shown, for example, in FIG. 1.

Fluidization medium 7 may comprise a gas. The gas may be selected to not cause undesired reactions with particles 5. For example, fluidization medium 7 may have an oxygen gas content of about 8% or less (by volume) which is significantly lower than that of atmospheric air which generally has an oxygen content of about 21%. Fluidization medium 7 may comprise, for example, air that has been depleted in oxygen, nitrogen gas, steam, exhaust gas from a combustion process, flue gas, mixtures of these or the like. In some embodiments, fluidization medium 7 is recirculated flue gas. In some embodiments, fluidization medium 7 is an inert gas. Fluidization medium 7 may be pressurized (e.g. fluidization medium 7 may be at a pressure greater than 1atm).

As discussed further herein, reactor 20 may have a plurality of fluid inlets 28 which can carry fluidization medium 7 into corresponding regions in reactor 20. In the embodiments illustrated in FIGS. 3A and 6A to 6E, reactor 20 comprises five fluid inlets 28 (e.g. fluid inlets 28A, 28B, 28C, 28D, 28E) for delivering fluidization medium 7 into five regions 23A, 23B, 23C, 23D, 23E respectively. The number of fluid inlets 28 and regions may be varied. Reactor 20 may comprise more than or less than five fluid inlets 28.

Fluid inlets 28 are spaced apart along vessel 22 in first direction 12. In some embodiments, fluid inlets 28 are spaced apart evenly in the first direction 12. This is not mandatory. In some embodiments, fluid inlets 28 are spaced apart in the first direction 12 by between about 20 cm and 60 cm. In some embodiments, fluid inlets 28 may be aligned with one another (e.g. as shown, for example, in FIG. 4B). This is not mandatory. In some embodiments, fluid inlets 28 are staggered (as shown, for example, in FIG. 4C). In some embodiments, fluid inlets 28 are centered on bottom wall 22A in the third direction 16.

Figure 4A:
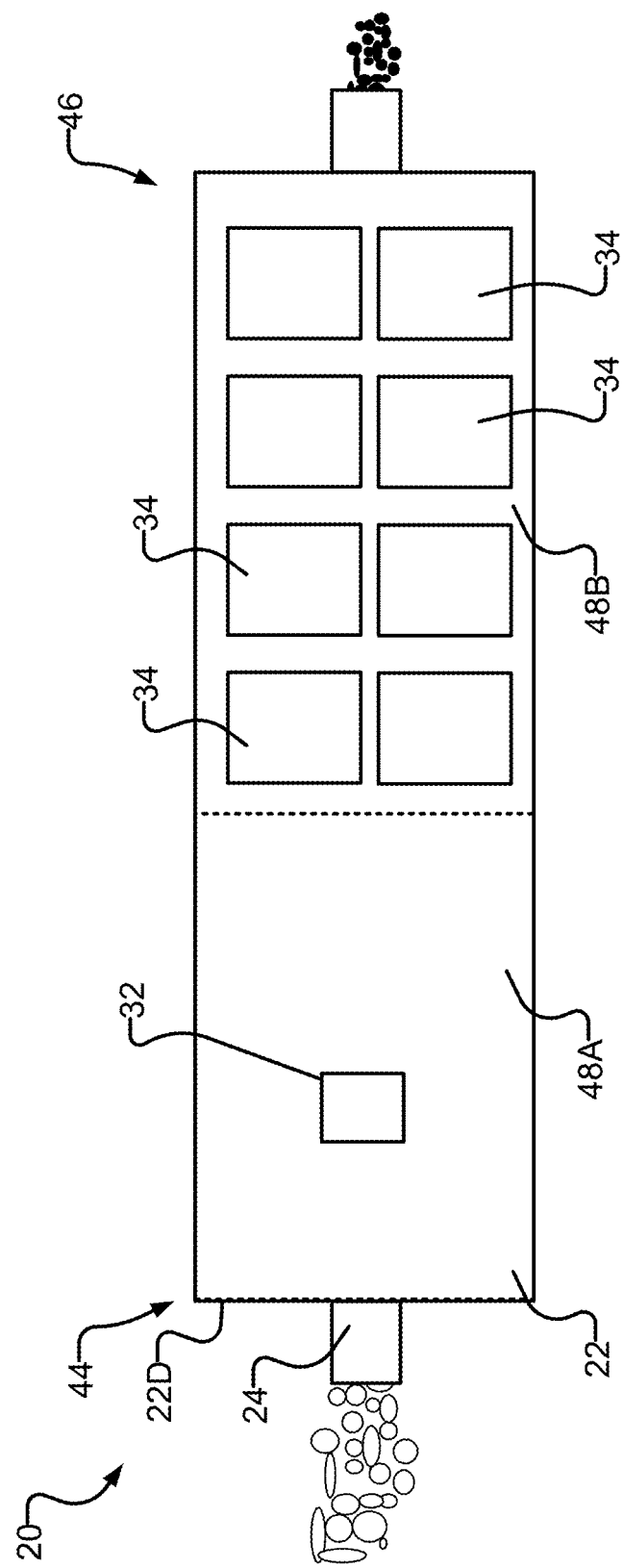
FIG. 4A is a schematic top plan view of the reactor of FIG. 1.
Figure 4B:
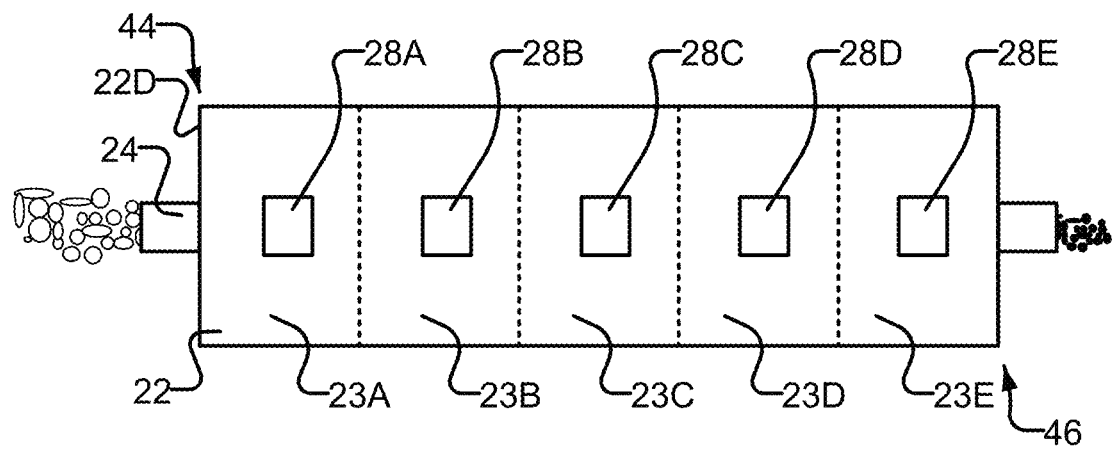
FIG. 4B is a schematic top plan view of an orientation of fluid inlets of a reactor according to an exemplary embodiment of the invention.
Figure 4C:
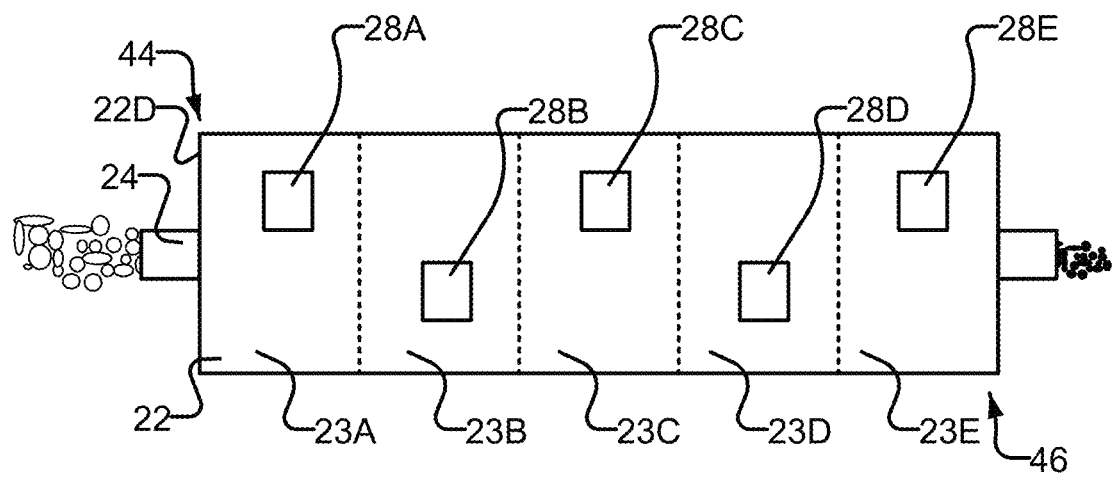
FIG. 4C is a schematic top plan view of an orientation of fluid inlets of a reactor according to an exemplary embodiment of the invention.
Figure 4D:
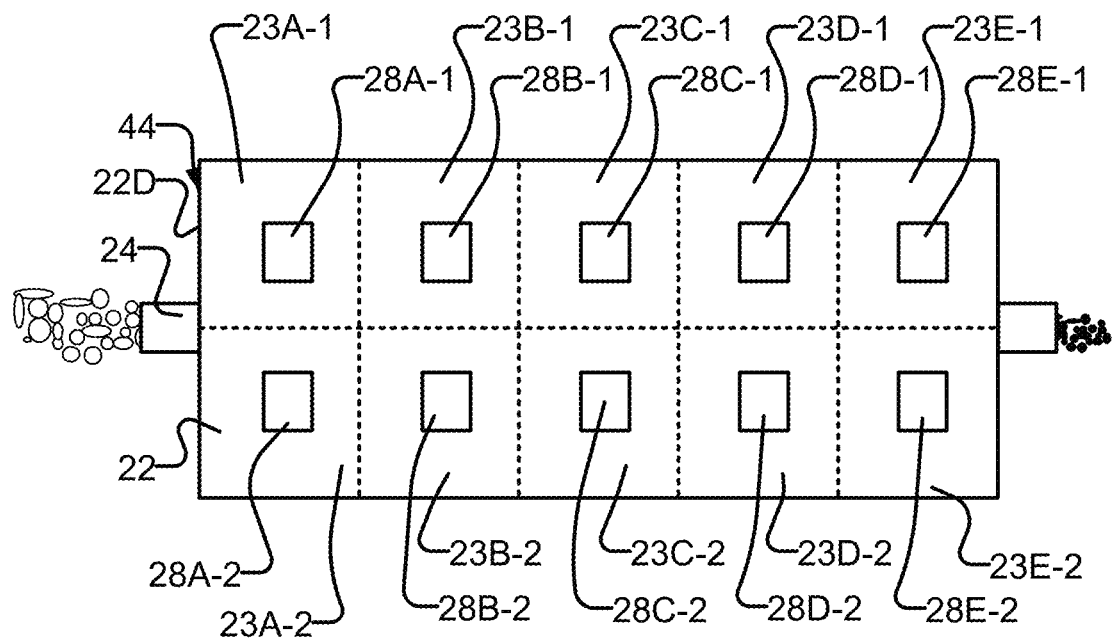
FIG. 4D is a schematic top plan view of an orientation of fluid inlets of a reactor according to an exemplary embodiment of the invention.

In some embodiments, fluid inlets 28 may be paired as shown in FIG. 4D. For example, two fluid inlets 28A-1 and 28A-2 may be aligned in third direction 16 and additional pairs of fluid inlets (e.g. fluid inlets 28B-1 and 28B-2, 28C-1 and 28C-2, 28D-1 and 28D-2, and 28E-1 and 28E-2) may be spaced apart in first direction 12 to effectively create 10 regions 23A-1, 23A-2, 23B-1, 23B-2, 23C-1, 23C-2, 23D-1, 23D-2, 23E-1 23E-2.

Such a configuration, with pairs (or triplets or quadruplets etc.) of fluid inlets 28 aligned in third direction 16 may allow for a chamber 23 with an increased width in third direction and/or may reduce undesired piling of particles 5 (particularly near the third direction 16 edges of chamber 23).

Fluid inlets 28 may comprise any suitable apparatus for delivering fluidization medium 7 into vessel 22 in second direction 14. In some embodiments, fluid inlets 28 are operable to vary the flow of fluidization medium 7 for example by 'pulsing' or switching the flow of fluidization medium 7 on and off.

Fluid inlets 28 may be controlled by a suitable mechanical and/or electronic control mechanism to vary the flow of fluidization medium 7 into different regions of chamber 23 in coordination with one another. For example, fluid inlets 28 may be independently controllable or controlled by a mechanism which adjusts fluid inlets 28 to vary flows of fluidization medium 7 into different regions in a desired sequence.

As discussed further herein, in some embodiments, fluid inlets 28 may be operable in series (e.g. fluid inlets 28 may be operable such that second fluid inlet 28B delivers fluidization medium 7 into chamber 23 after first fluid inlet 28A delivers fluid into chamber 23 and third fluid inlet 28C delivers fluidization medium 7 into chamber 23 after second fluid inlet 28B delivers fluidization medium 7 into chamber 23, and so on).

In some embodiments each fluid inlet 28 is controlled to vary the flow of fluidization medium 7 into a corresponding region according to a cycle and fluid inlets 28 are collectively controlled so that the relative phases of their cycles are delayed more and more as one progresses along chamber 23 in direction 12. For example, in each cycle a fluid inlet 28 may deliver fluidization medium 7 at a first rate in a first portion of the cycle and may deliver fluidization medium 7 at a second rate lower than the first rate in a second portion of the cycle. In some embodiments the first rate is at least twice the second rate. In some embodiments a fluid outlet 28 may be controlled to deliver no or very little fluidization medium 7 for the second portion of each cycle.

In some embodiments, fluidization medium 7 is delivered into vessel 22 at a rate such that a superficial velocity of the fluidization medium 7 entering chamber 23 is in the range of about 1 to about 1.5 times the minimum fluidization velocity of particles 5. In some embodiments, fluidization medium 7 is delivered into vessel 22 at a rate such that a superficial velocity of the fluidization medium 7 entering chamber 23 is in the range of about 1 to about 1.2 times the minimum fluidization velocity of particles 5. "Minimum fluidization velocity" is the superficial velocity of fluidization medium 7 at which the drag force of the upward moving fluidization medium 7 on particles 5 becomes equal to the weight of particles 5 in vessel 22. When the superficial velocity of fluidization medium 7 is greater than the minimum fluidization velocity, the drag force of the upward moving fluidization medium 7 on particles 5 is greater than the weight of particles 5 in vessel 22 and particles 5 may be described as being "fluidized".

In some embodiments, a rate at which fluidization medium 7 is delivered into vessel 22 is higher near first end 44 where particles 5 may be larger and/or heavier than near second end 46 where particles 5 may be smaller and/or lighter.

In some embodiments, each of fluid inlets 28 comprises flow control means for regulating the flow of fluidization medium 7 into chamber 23 via inlets 28. The flow control means may comprise, for example, a distributed plate, valves (e.g. butterfly valves), a rotating air distributor or other available intermittently activatable apparatus for delivering fluidization medium 7. In some embodiments, each fluid inlet 28 is connected to a common fluid source. In other embodiments, one or more of fluid inlets 28 have their own fluid source.

Where valves are provided to regulate the flow of fluidization medium 7 via fluid inlets 28 the valves may be electronically operated (e.g. using solenoids or other electrically operable valve actuators) and/or mechanically operated (e.g. by cams, pneumatic actuators, hydraulic actuators or the like). In some embodiments, the duration and interval of valves being opened may be controlled by a suitable controller.

In some embodiments, the flow of fluidization medium 7 via fluid inlets 28 may be regulated by employing different length manifolds to provide fluidization medium 7 from a single source (e.g. a combustor such as a pulse jet). Due to the different length manifolds, the fluidization medium 7 can be caused to arrive at each fluid inlet 28 as desired without employing valves.

FIG. 3B depicts an exemplary, non-limiting, fluid inlet 28A as may be applied in some embodiments of the invention. In the FIG. 3B embodiment, fluid inlet 28A comprises a fluid chamber 36 containing pressurized fluidization medium 7. A seal 40 is moveable between an open position and a closed position. If seal 40 is in the open position (as shown, for example, in FIG. 3B), fluidization medium 7 may be caused to travel from fluid chamber 36 into chamber 23 due to the pressure gradient between fluid chamber 36 and chamber 23. When in the closed position (as shown, for example, in FIG. 3A), seal 40 prevents or substantially prevents fluidization medium 7 from travelling from fluid chamber 36 into chamber 23 or reduces the flow of fluidization medium 7 into vessel 22. By selectively operating a piston 38, seal 40 may be opened or closed.

Piston 38 may be a cam-actuated piston, a hydraulic piston, a pneumatic piston or any other suitable piston. As compared to, for example, a distributing plate, a piston does not require revolving parts and is less likely to fail. Pistons of different drive force, frequency and size are widely available. As compared to solenoid valves, pistons tend to be more reliable and are more suited to continuous operation at frequencies in the range of about 1 Hz to 2 Hz.

In some embodiments, fluid chamber 36 is common to one or more of fluid inlets 28. For example, fluid chamber 36 may comprise a plenum that is common to two or more or all of fluid inlets 28A, 28B, 28C, 28D, 28E. Each fluid inlet 28 may comprise a flow control means (e.g. a piston-activated seal 40) operable to allow fluidization medium 7 to be selectively delivered from common fluid chamber 36, through the respective fluid inlet 28 and into to chamber 23 as desired.

In some embodiments, fluidization medium 7 is delivered into vessel 22 through one or more plenum chambers 30A, 30B, 30C, 30D, 30E. In the FIG. 1 embodiment, fluidization medium 7 delivered from first fluid inlet 28A is delivered through first plenum chamber 30A, fluidization medium 7 delivered from second fluid inlet 28B is delivered through second plenum chamber 30B, fluidization medium 7 delivered from third fluid inlet 28C is delivered through third plenum chamber 30C, fluidization medium 7 delivered from fourth fluid inlet 28D is delivered through fourth plenum chamber 30D and fluidization medium 7 delivered from fifth fluid inlet 28E is delivered through fifth plenum chamber 30E.

By delivering fluidization medium 7 through separated plenum chambers, the instantaneous gas flow rate may be relatively higher when any one seal 40 is open (as compared to if all seals 40 were open concurrently), thereby facilitating particles 5 to overcome their cohesive forces and improving gas-solid contact and heat/mass transfer. By delivering fluidization medium 7 through a plurality of separated plenum chambers, fluidization medium 7 may be more precisely distributed along vessel 22. This facilitates independently delivering fluidization medium 7 to individual regions (e.g. to deliver fluidization medium 7 from first fluid inlet 28A into first region 23A or to deliver fluidization medium 7 from second fluid inlet 28B into second region 23B, etc.) as desired.

FIG. 4A is a top plan view of reactor 20 according to one embodiment of the invention which provides microwave boost heating. In the FIG. 4A embodiment, vessel 22 of reactor 20 may nominally be separated into a first zone 48A and a second zone 48B. First zone 48A is located toward inlet 24 and second zone 48B is located toward outlet 26. In first zone 48A, particles 5 are heated by fluidization medium 7 while in second zone 48B, particles 5 are heated by fluidization medium 7 and by energy from microwaves emitted by magnetrons 34. Any suitable number of magnetrons 34 may be provided to heat particles 5 in second zone 48B. For example, in the illustrated embodiment, eight magnetrons 34 are provided to heat particles 5 in second zone 48B. In other embodiments, more than or fewer than eight magnetrons may be provided. The number of magnetrons may be dependent on the length of vessel 22. In some embodiments, magnetrons 34 may be arranged to heat particles 5 along an entire first direction 12 dimension of vessel 22 (e.g. there is no first zone 48A). In some embodiments, magnetrons 34 may be arranged to heat particles 5 along less than 80%, less than 60% or less than 50% of the first direction 12 dimension of vessel 22.

In some embodiments, reactor 20 comprises one or more vibrators to cause vessel 22 to vibrate. For example, reactor 20 may comprise a vibration motor such as an eccentric rotating mass vibration motor, a linear resonant actuator, or the like to cause vessel 22 and/or particles 5 to vibrate as desired.

Although the embodiments depicted and described herein may show a reactor 20 that provides a linear travel path for particles 5, this is not mandatory. For example, a reactor could provide a travel path for particles 5 that is curved in one or more of first direction 12, second direction 14 and third direction 16.

Although the embodiments of reactor 20 depicted and described herein may show a reactor that provides a travel path for particles 5 from one end of a vessel to the other, it should be understood that the travel path for particles 5 could extend from a central region of a vessel to a more distal region of the vessel. For example, particles 5 could be fed to a middle of a vessel and directed in opposite directions toward opposite ends of the vessel. Alternatively or additionally, reactor 20 could be split across multiple vessels.

Another aspect of the invention provides methods for processing particles 5. Processing particles 5 may comprise torrefying particles 5 or pyrolyzing particles 5, as desired. In some embodiments, if particles 5 comprise a mixture of biomass particles and polymer particles having, for example, a composition with greater than 10% polymer particles by weight, it may be desirable to pyrolyze particles 5. The methods may be implemented using one or more of the reactors described herein, although this is not mandatory.

Figure 5B:
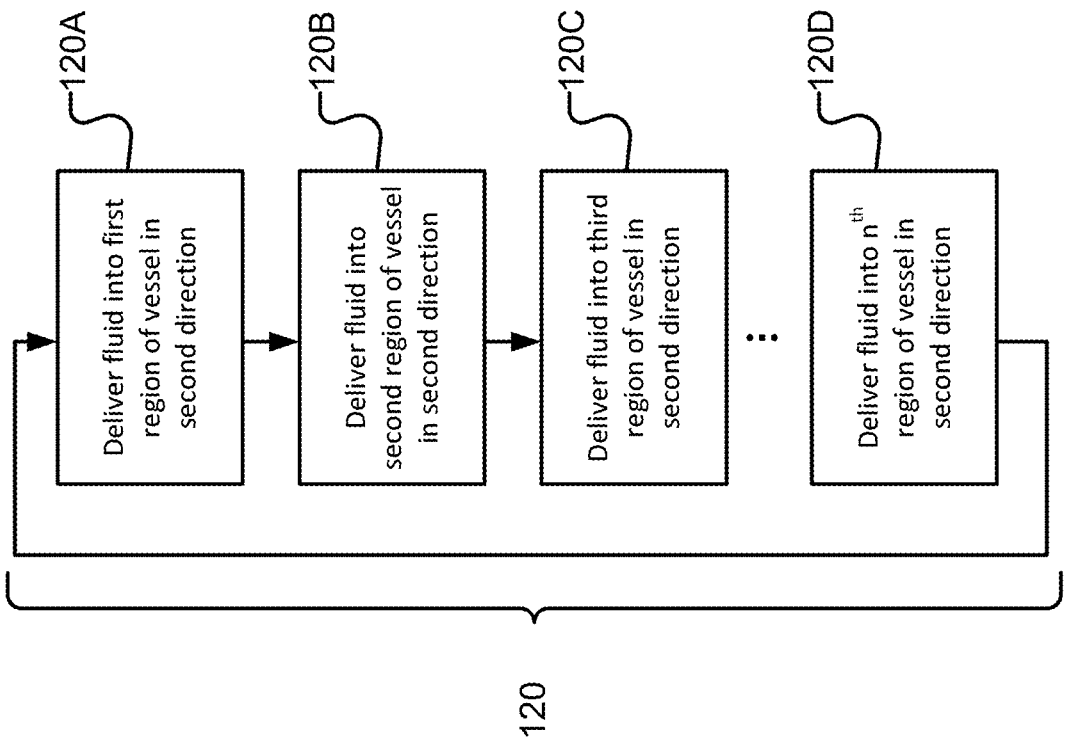
FIG. 5B is a block diagram of a method for fluidizing biomass according to an exemplary embodiment of the invention.
Figure 5A:
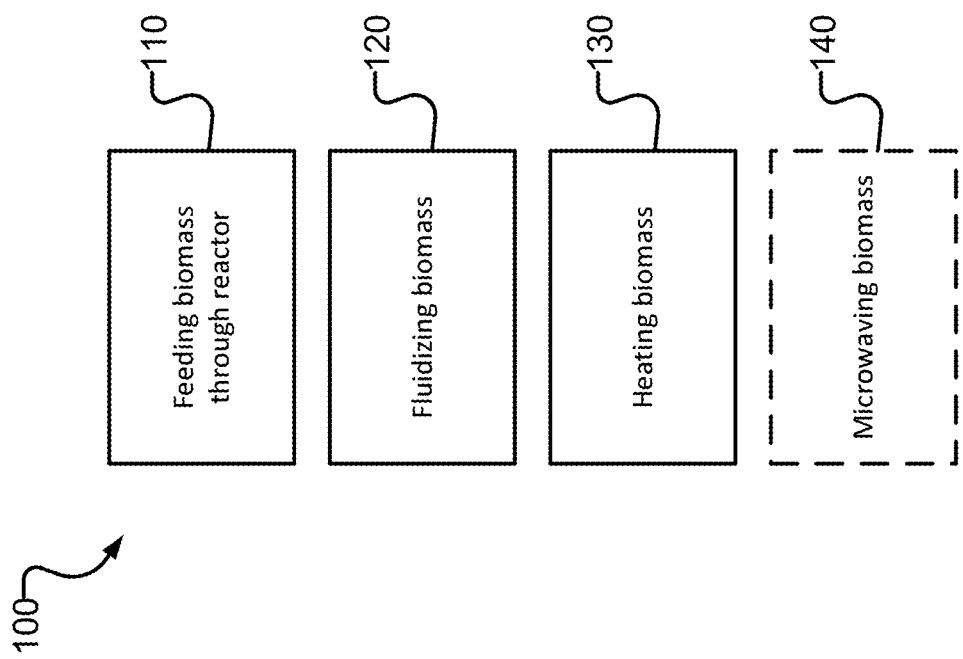
FIG. 5A is a block diagram of a method for processing biomass according to an exemplary embodiment of the invention.

FIG. 5A shows a block diagram of an exemplary non-limiting method 100 for processing biomass. Method 100 may be described herein in relation to reactor 20 for convenience. However, it should be understood that method 100 could be carried out with reactors other than reactor 20 or the reactors described herein.

In some embodiments, method 100 comprises a first step 110 of feeding particles 5 through chamber 23 of reactor 20. In some embodiments, particles 5 may be fed through chamber 23 in first direction 12. Step 110 may comprise feeding particles 5 into first region 23A of chamber 23 through a biomass inlet 24 as described herein.

Particles 5 may travel in first direction 12 through vessel 22 due to the feeding of particles 5 into vessel 22. In some embodiments, the feeding of new particles 5 into vessel 22 at step 110 may increase a density of particles 5 near inlet 24. This in turn may create a density gradient that pushes particles 5 already in vessel 22 in first direction 12. For example, particles 5 being fed into first region 23A may cause at least some particles 5 previously in first region 23A to move into second region 23B. Such first direction 12 movement of particles 5 may be aided by the fluidization of particles 5 which facilitates or promotes movement of particles 5 in first direction 12 in chamber 23 and/or by gravity if reactor 20 is sloped downward.

The rate at which particles 5 are fed into vessel 22 may be dependent on the desired residence time of particles 5 in reactor 20. For a longer desired residence time (e.g. for torrefaction), the feed rate may be reduced. For shorter residence times (e.g. for pyrolysis), the feed rate may be increased. In some embodiments, the desired residence time of particles 5 in reactor 20 is in the range of about 5 minutes to about 40 minutes (e.g. for torrefaction). In some embodiments, the desired residence time of particles 5 in reactor 20 is in the range of about 10 minutes to about 30 minutes (e.g. for torrefaction or pyrolysis). In some embodiments, the desired residence time of particles 5 in reactor 20 is in the range of about 1 minute to about 10 minutes (e.g. for pyrolysis). By adjusting the residence time of the reactor, the severity of pyrolysis, yield and conversion of bio-oil and biochar may be controlled. By shortening the residence time of reactor 20, the reactor footprint can be reduced for a given level of throughput of biomass.

Method 100 comprises a step 120 of fluidizing particles 5. Step 120 may occur concurrently with step 110. Fluidizing particles 5 may comprise propagating one or more fluidization waves in first direction 12 inside chamber 23. Second step 120 may comprise a number of sub-steps as shown, for example, in FIG. 5B.

In some embodiments, second step 120 includes a sub-step 120A. Sub-step 120A comprises delivering a first volume 7A of fluidization medium 7 into a first region 23A of vessel 22 in second direction 14 to fluidize particles 5 in first region 23A of vessel 22, as shown, for example, in FIG. 6A. First volume of fluidization medium 7A may be delivered by first fluid inlet 28A. First volume of fluidization medium 7A may be a discrete volume 7A of fluidization medium 7 delivered as a burst. Delivery of fluidization medium 7 into first region 23A may, at least temporarily, cause the particles 5 located in first region 23A to fluidize (e.g. convert from a solid-like state to a dynamic fluid-like state) and/or may reduce the packing density of particles 5 located in first region 23A.

After the delivery of first volume 7A of fluidization medium 7, particles 5 located in first region 23A may begin to settle (e.g. due to the force of gravity). In some embodiments, particles 5 located in first region 23A may settle completely (e.g. on bottom wall 22A) before additional fluidization medium 7 is delivered to first region 23A. In other embodiments, an additional burst of fluidization medium 7 into first region 23A (e.g. when sub-step 120A is repeated) may cause the particles 5 located in first region 23A to fluidize and/or may reduce the packing density of particles 5 located in first region 23A before particles located in first region 23A have settled completely (e.g. on bottom wall 22A).

Figure 6A:
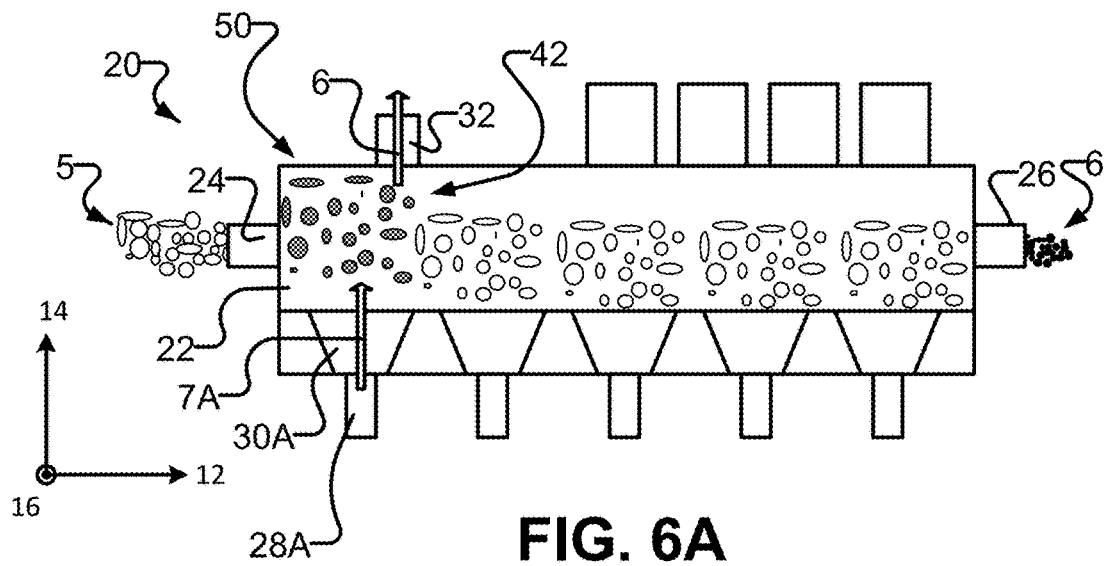
FIGS. 6A to 6F are schematic side view cross-sections of a reactor at various steps of the method of FIG. 5A according to an exemplary embodiment of the invention.
Figure 6B:
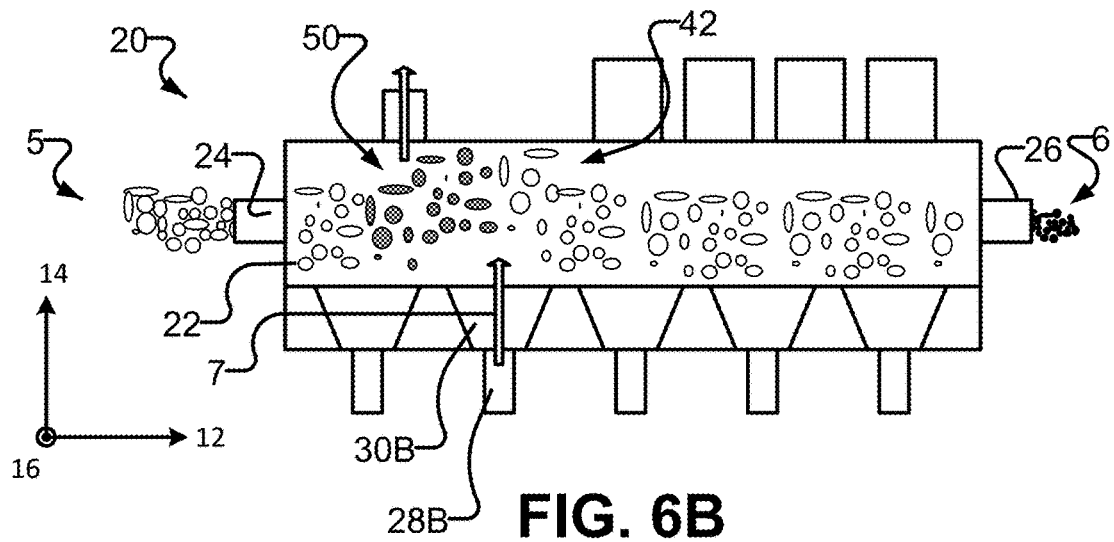

In some embodiments, second step 120 includes a sub-step 120B as shown, for example, in FIG. 6B. Sub-step 120B may occur, after, with a delay after or concurrently with sub-step 120A. Sub-step 120B may be substantially similar to sub-step 120A except that sub-step 120B comprises delivering a second volume 7B of fluidization medium 7 into a second region 23B of vessel 22 in second direction 14 to fluidize particles 5 in second region 23B of vessel 22. Second volume 7B of fluidization medium may be delivered by second fluid inlet 28B.

Figure 6C:
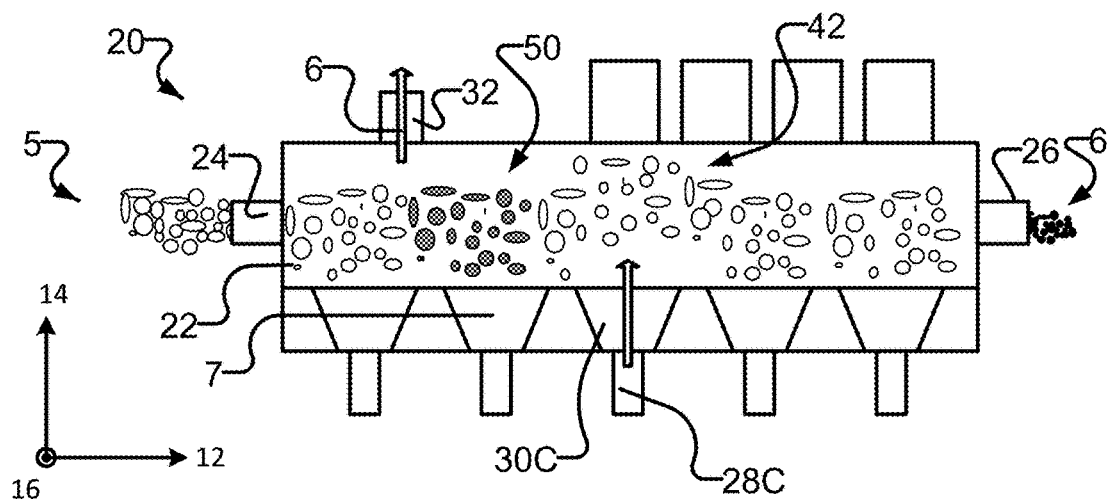

In some embodiments, second step 120 includes a sub-step 120C as shown, for example, in FIG. 6C. Sub-step 120C may occur, after, with a delay after or concurrently with sub-step 120B. Sub-step 120C may be substantially similar to sub-step 120B except that sub-step 120C comprises delivering a third volume 7C of fluidization medium 7 into third region 23C of vessel 22 in second direction 14 to fluidize particles 5 in third region 23C of vessel 22. Third volume 7C of fluidization medium 7 may be delivered by third fluid inlet 28C.

Figure 6D:
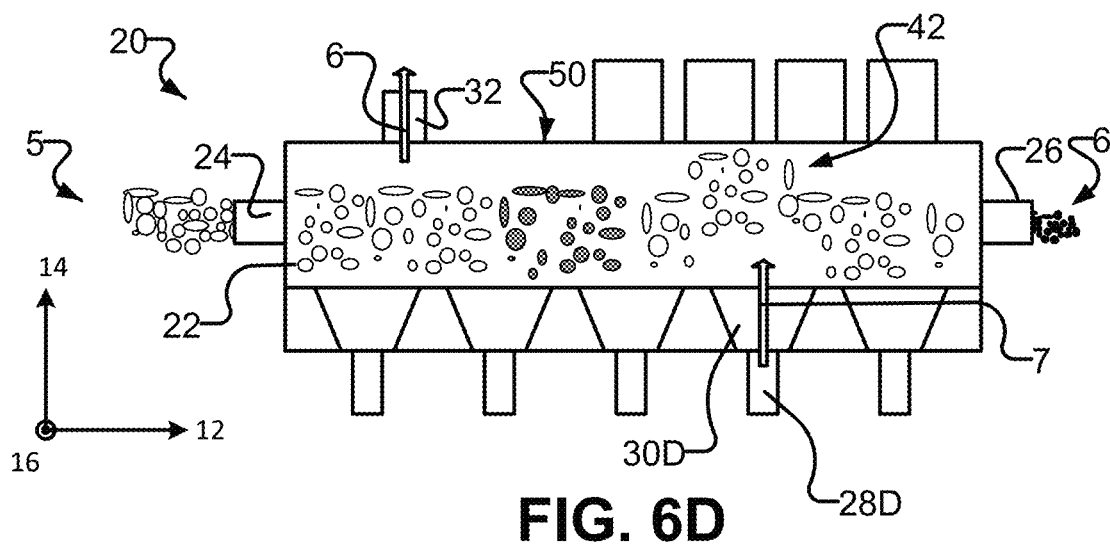

In some embodiments, second step 120 includes a sub-step 120D as shown, for example, in FIG. 6D. Sub-step 120D may occur, after, with a delay after or concurrently with sub-step 120C. Sub-step 120D may be substantially similar to sub-step 120C except that sub-step 120D comprises delivering a fourth volume 7D of fluidization medium 7 into fourth region 23D of vessel 22 in second direction 14 to fluidize particles 5 in fourth region 23D of vessel 22. Fourth volume 7D of fluidization medium 7 may be delivered by fourth fluid inlet 28D.

Figure 6E:
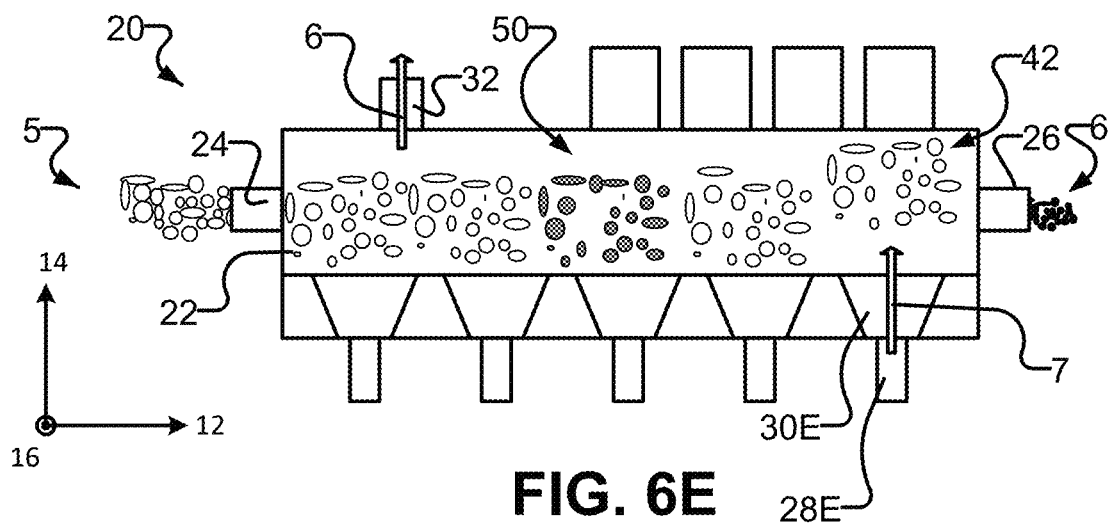

In some embodiments, second step 120 includes a sub-step 120E as shown, for example, in FIG. 6E. Sub-step 120E may occur, after, with a delay after or concurrently with sub-step 120D. Sub-step 120E may be substantially similar to sub-step 120D except that sub-step 120E comprises delivering a fifth volume 7E of fluidization medium 7 into fifth region 23E of vessel 22 in second direction 14 to fluidize particles 5 in fifth region 23E of vessel 22. Fifth volume 7E of fluidization medium 7 may be delivered by fifth fluid inlet 28E.

Sub-steps 120A to 120E may repeat until method 100 is completed. In some embodiments, each sub-step of step 120 occurs in sequence without any overlap. This is not mandatory. In some embodiments, one or more sub-steps may occur concurrently or may partially overlap.

Figure 6F:
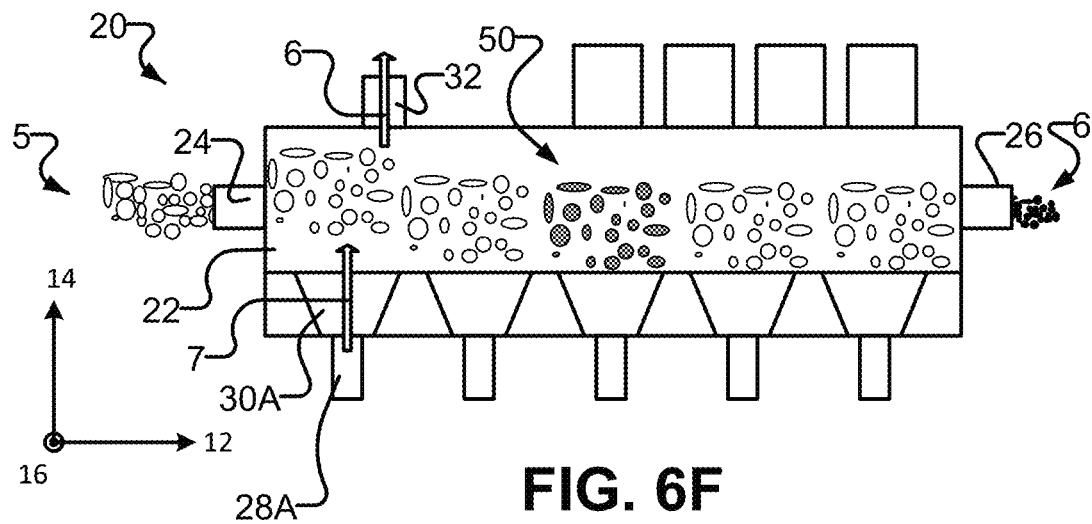
Figure 7:
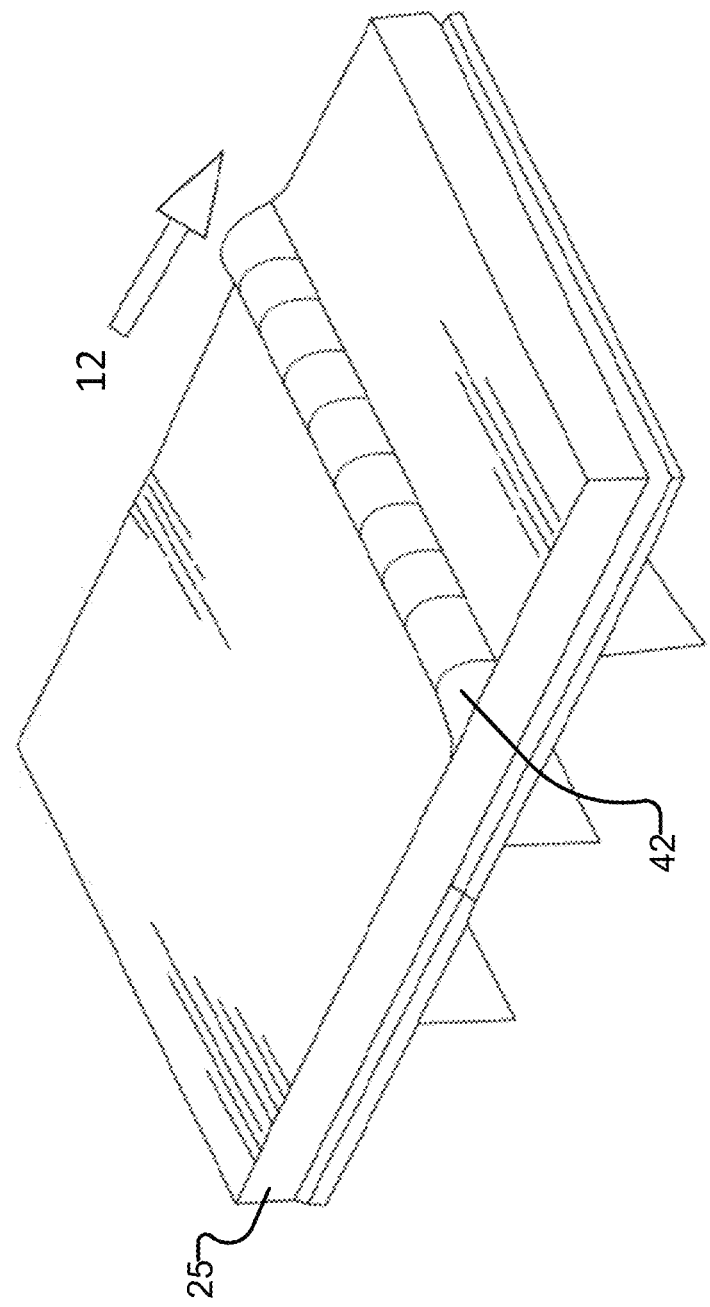
FIG. 7 is a schematic perspective view of a fluidization wave according to an exemplary embodiment of the invention.

Each repetition of step 120 may cause a fluidization wave 42 (or fluidization wave 42) to travel through bed 25 in first direction 12 as illustrated in FIG. 7. Fluidization wave 42 may comprise a region of bed 25 where a packing density of particles 5 is relatively lower than a packing density of particles 5 in the rest of bed 25 due to the delivery of fluidization medium 7 into that region. As fluidization medium 7 is delivered sequentially at spaced apart locations in first direction 12 during step 120, fluidization wave 42 is caused to travel in first direction 12. This phenomenon can be seen in FIGS. 6A to 6E where a first fluidization wave 42 travels from first end 44 to second end 46 and in FIG. 6F where a second fluidization wave 42 is started in first region 23A. While the illustrated embodiments only show a single fluidization wave 42 travelling through bed 25 at any given time, this is not mandatory. Instead, multiple fluidization waves 42 could travel through bed 25 at any given time (e.g. by allowing multiple sub-steps of step 120 to occur concurrently).

Fluidization waves 42 may facilitate and/or cause particles 5 to travel in first direction 12. Fluidization waves 42 may facilitate in transforming random bubble behaviour typically seen in fluidized bed reactors into regular and ordered patterns, thereby achieving a relatively uniform and even bed 25. particles suspended in bed 25 are therefore more likely to experience uniform and consistent residence times.

The periodic supply of fluidization medium 7 (as opposed to maintaining a constant flow rate) in each of regions 23A, 23B, 23C, 23D, 23E imparts additional acceleration on particles 5 that may help to break down cohesion and/or bridging between particles 5 and/or to increase the flowability of particles 5 in bed 25 (e.g. in first direction 12). Consequently, better gas-solid contact is present between particles 5 and fluidization medium 7 in reactor which allows for higher heat and mass transfer rates between fluidization medium 7 and particles 5.

The sub-steps of step 120 may occur at any desirable rate. In some embodiments, each fluid inlet 28 is controlled to deliver fluidization medium 7 at a rate of between approximately 0.5 Hz and 5 Hz. In some embodiments, the duty cycle of each fluid inlet 28 is between approximately 30% and 70%. For example, a fluid inlet 28 could deliver fluidization medium 7 at a rate of 1 Hz with a duty cycle of 30% such that fluid inlet 28 is repetitively opened for 0.3 seconds and closed for 0.7 seconds. In some embodiments, adjacent fluid inlets (e.g. sub-steps 120A to 120E) are selectively delayed by between approximately 0.1 seconds and 0.9 seconds. In some embodiments, there is no delay between adjacent fluid inlets 28 and some or all fluid inlets 28 are synchronized. In some embodiments, adjacent fluid inlets 28 are paired and there is instead a delay between pairs of fluid inlets 28.

For example, first fluid inlet 28A may operate at 1 Hz with a duty cycle of 50% while second fluid inlet 28A operates at 1 Hz with a delay of 0.5 seconds and a duty cycle of 50% such that there is no effectively overlap between delivery of fluidization medium 7 from first fluid inlet 28A and second fluid inlet 28B. In this case, third fluid inlet 28C may operate at 1 Hz with a delay of 0.5 seconds (from second fluid inlet 28B) and a duty cycle of 50% such that there is effectively no overlap between delivery of fluidization medium 7 from second fluid inlet 28B and third fluid inlet 28C but there is effectively complete overlap between delivery of fluidization medium 7 from third fluid inlet 28C and first fluid inlet 28A.

In another example, first fluid inlet 28A may operate at 1 Hz with a duty cycle of 30% while second fluid inlet 28A operates at 1 Hz with a delay of 0.2 seconds and a duty cycle of 30% such that there is some overlap between delivery of fluidization medium 7 from first fluid inlet 28A and second fluid inlet 28B.

In some embodiments, the duty cycle of each fluid inlet 28 is chosen to ensure fluidization of particles 5 in the respective region of chamber 23. In some embodiments, the duty cycle is increased (to lower the velocity of fluidization medium 7) as moisture in (and consequently mass of) particles 5 is decreased. In some embodiments, the duty cycle is decreased (to increase the velocity of fluidization medium 7) as particles 5 become exhibit a greater tendency to stick to one another (e.g. since they are more needle-like in shape and/or less spherical and/or contain higher moisture content).

FIGS. 6A to 6F highlight (with a darker filling) a particular grouping 50 of particles 5 as it travels (at an exaggerated rate for illustrative purposes) in first direction 12 from first end 44 of vessel 22 toward second end 46 of vessel 22. As can be seen from FIGS. 6A to 6F, fluidization wave 42 travelling in first direction 12 from first end 44 of vessel 22 to second end 46 of vessel 22 travels faster than grouping 50 of particles 5. As such, any individual particle 5 will generally be subject to a plurality of fluidization waves 42 as it travels through vessel 22.

The number of sub-steps of step 120 may be dependent on the number of fluid inlets 28. For example, in the illustrated embodiments, reactor 20 comprises five fluid inlets 28 and there is a corresponding sub-step of step 120 for each fluid inlet 28. However, while the illustrated embodiment depicts five fluid inlets 28, it should be understood that a reactor employed for method 100 could comprise any number, n, of fluid inlets 28 (where n is an integer) and that there could be a corresponding number, n, of sub-steps of step 120 corresponding to delivering volumes of fluid through each of the number, n, of fluid inlets 28.

Method 100 comprises a step 130 of heating particles 5. Step 130 may occur concurrently with one or both of steps 110 and 120. At step 130, particles 5 may be heated in various manners. In some embodiments, particles 5 may be heated (e.g. by convective heat transfer) by fluidization medium 7 which itself may be heated before being delivered into vessel 22 at step 120. For example, fluidization medium 7 may enter chamber 23 at a temperature of 300° C. or more (e.g. for torrefaction) or 500° C. or more (e.g. for pyrolysis). In some embodiments, fluidization medium 7 may enter chamber 23 at a temperature of up to about 800° C. (e.g. for pyrolysis). In some embodiments, the temperature of fluidization medium 7 is dependent on the type, size and/or shape of particles 5 and the desired reaction in reactor 20. For example, as the composition of particles 5 skews toward more polymer particles and less biomass particles, it may be desirable to reduce the temperature of fluidization medium 7. In some embodiments, where particles 5 have a composition of greater than 90% polymer particles by weight, fluidization medium 7 may enter chamber 23 at a temperature of between about 300° C. and 500° C. (e.g. for pyrolysis). By contrast, when particles 5 comprise more than 90% biomass by weight, higher temperatures of between about 500° C. and 800° C. may be used to pyrolize particles 5.

In some embodiments, fluidization medium 7 is provided from a common source and thus fluidization medium 7 provided at each sub-step of step 120 is provided at a constant or substantially constant temperature. In other embodiments, fluidization medium 7 could be provided at each sub-step of step 120 at a different temperature. For example, the temperature of fluidization medium 7 delivered at each sub-step of step 120 may increase from sub-step 120A to sub-step 120E to attain a desired rate of heating of particles 5 as the particles 5 travel along chamber 23.

Figure 8A:
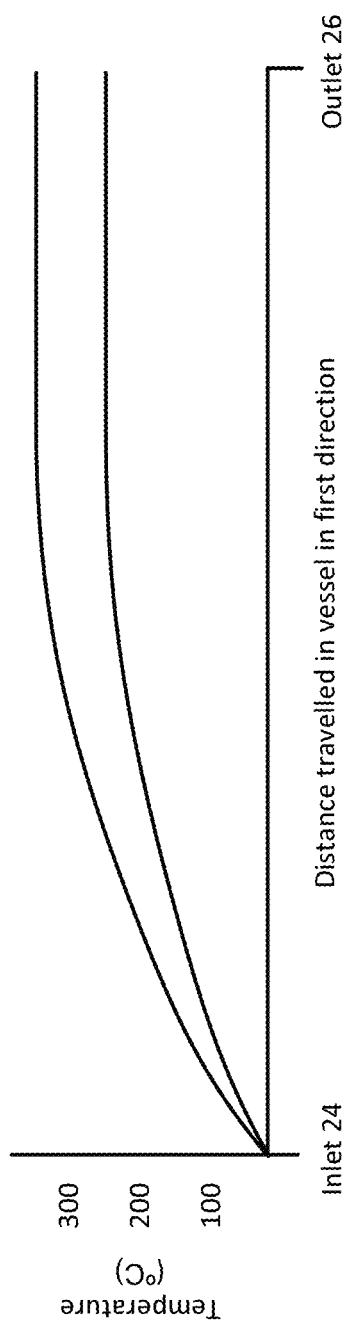
FIG. 8A is a chart representing the temperature of a biomass particle as it travels in a reactor according to an exemplary embodiment of the invention.

As each particle 5 travels through vessel 22 in first direction 12, it is heated by fluidization medium 7. FIG. 8A depicts an exemplary lower boundary and an exemplary upper boundary of a temperature of a particle 5 as a function of the distance it has travelled through vessel 22 in first direction 12. Specifically, FIG. 8A represents a reactor 20 without magnetrons (e.g. a reactor without a second zone 48B) or a reactor 20 where the magnetrons are off. The FIG. 8A heating rate could be employed for torrefaction of particles 5.

Method 100 may comprise an optional step 140 of microwaving particles 5. Step 140 may occur concurrently with some or all of steps 110, 120 and 130. Step 140 may occur in only a portion of vessel 22 (e.g. in second zone 48B).

Compared to convective heating through fluidization medium 7, microwave heating may be significantly faster, and particles 5 may be heated from their core to their exterior. However, some types of particles 5 may not absorb microwaves effectively. Therefore, in some embodiments, as part of step 140, microwave absorbent (also sometimes referred to as a microwave catalyst) may be mixed with particles 5 to increase the absorption of microwaves within vessel 22 and to thereby accelerate the rate of temperature increase of particles 5. In some embodiments, the microwave absorbent is heated by the microwaves (e.g. from magnetrons 34) at a higher rate than are particles 5 (e.g. because the absorbent has a higher dielectric constant than particles 5). Heat that is subsequently generated by the microwave absorbent may then be passed on to surrounding particles 5.

Various microwave absorbents may be employed such as, but not limited to, chemical solutions ($NH_3$, $H_2SO_4$ and $HCl$), inorganic compounds ($MgCl_2$, $Na_2HPO_4$, $CH_3COOK$ and $Al_2O_3$), catalysts ($K_3PO_4$, $K_2CO_3$, $KOH$, $FeSO_4$, $H_3BO_3$, $ZnCl_2$ and $H2SO_4$), natural zeolites, synthetic zeolites, and char. In some embodiments, a mixture of $K_3PO_4$ and clinoptilolite or bentonite is employed as a microwave absorbent.

Ideally, microwave absorbents have good microwave absorption capacity and good catalytic performance so as to increase the microwave heating rate and improve the quality of bio-oil and biochar produced by reactor 20. Resultant biochar may be employed as a soil conditioner. Biochar produced from microwave catalytic pyrolysis has been demonstrated to be more effective in increasing the soil water holding capacity due to its high porosity in comparison with biochar produced from conventional pyrolysis. Furthermore, catalysts or absorbents remaining in the biochar product can provide nutrients for the growth of bioenergy and food crops.

In some embodiments, microwave absorbents are provided in the form of particles that are similar in size to particles 5. In some embodiments, a composition of bed 25 is in the range of about 5% to about 30% microwave absorbent particles by weight. In some embodiments, a composition of bed 25 is in the range of about 15% to about 20% microwave absorbent particles by weight.

In some embodiments, microwave absorbent particles are mixed with particles 5 before entering chamber 23. In other embodiments, microwave absorbent particles are introduced into chamber 23 separately from particles 5. In some embodiments, microwave absorbent particles are introduced into chamber 23 continuously. In some embodiments, microwave absorbent particles are introduced into chamber 23 periodically or as needed.

In some embodiments, microwave absorbent particles are removed from chamber 23 with outputs 6. In such embodiments, it may be desirable to introduce additional microwave absorbent particles into chamber 23 at a similar rate to their removal. In other embodiments, microwave absorbent particles may remain in chamber 23, even as outputs 6 are removed from chamber 23. For example, in some cases polymer particles will produce a higher volume of oil vapours and a lower volume of solid materials. In such a case, since relatively less material is being removed through outlet 32, microwave absorbent particles may tend to remain within chamber 23 for longer periods of time. In such, cases it may be desirable to introduce additional microwave absorbent particles into chamber 23 intermittently or only as needed.

In some embodiments, as the composition of particles 5 comprises a greater ratio of polymer particles to biomass particles, microwave absorbent particles may facilitate maintaining fluidized bed 25 as the polymer particles are reacted and form vapours.

Figure 8B:
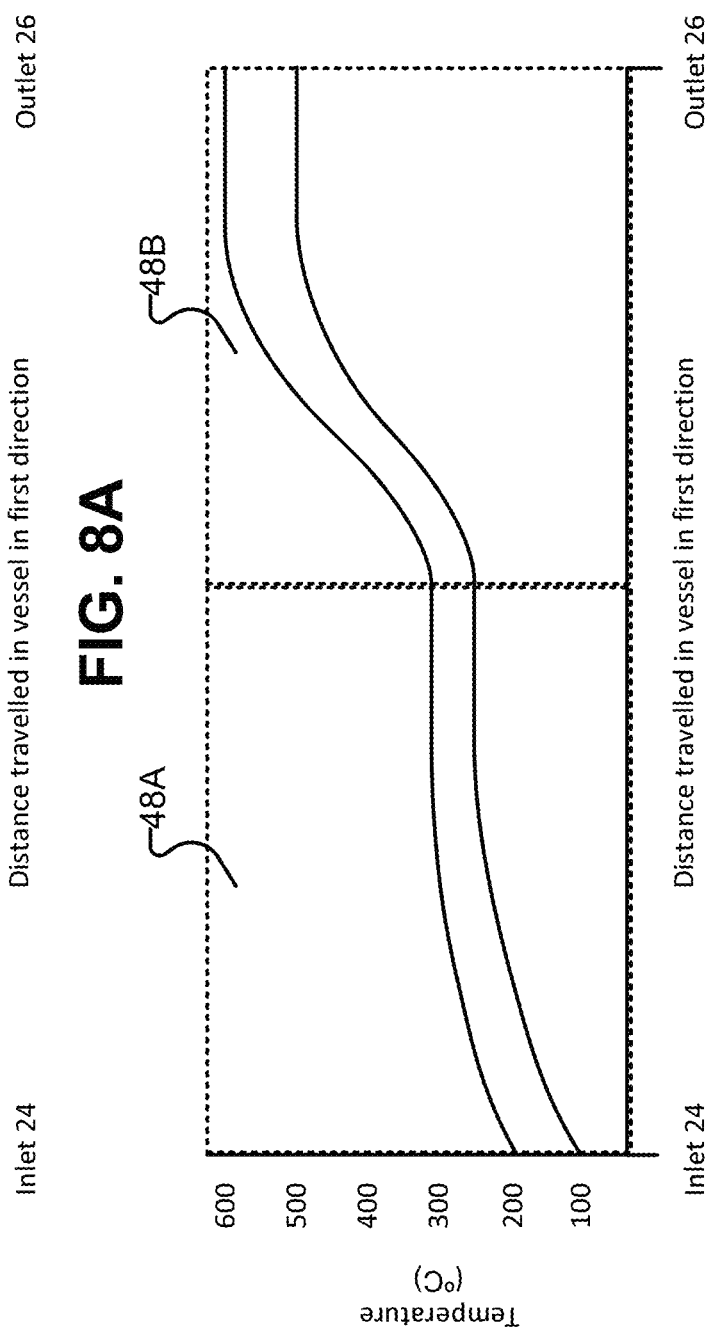
FIG. 8B is a chart representing the temperature of a biomass particle as it travels in another reactor according to an exemplary embodiment of the invention.
Figure 9:
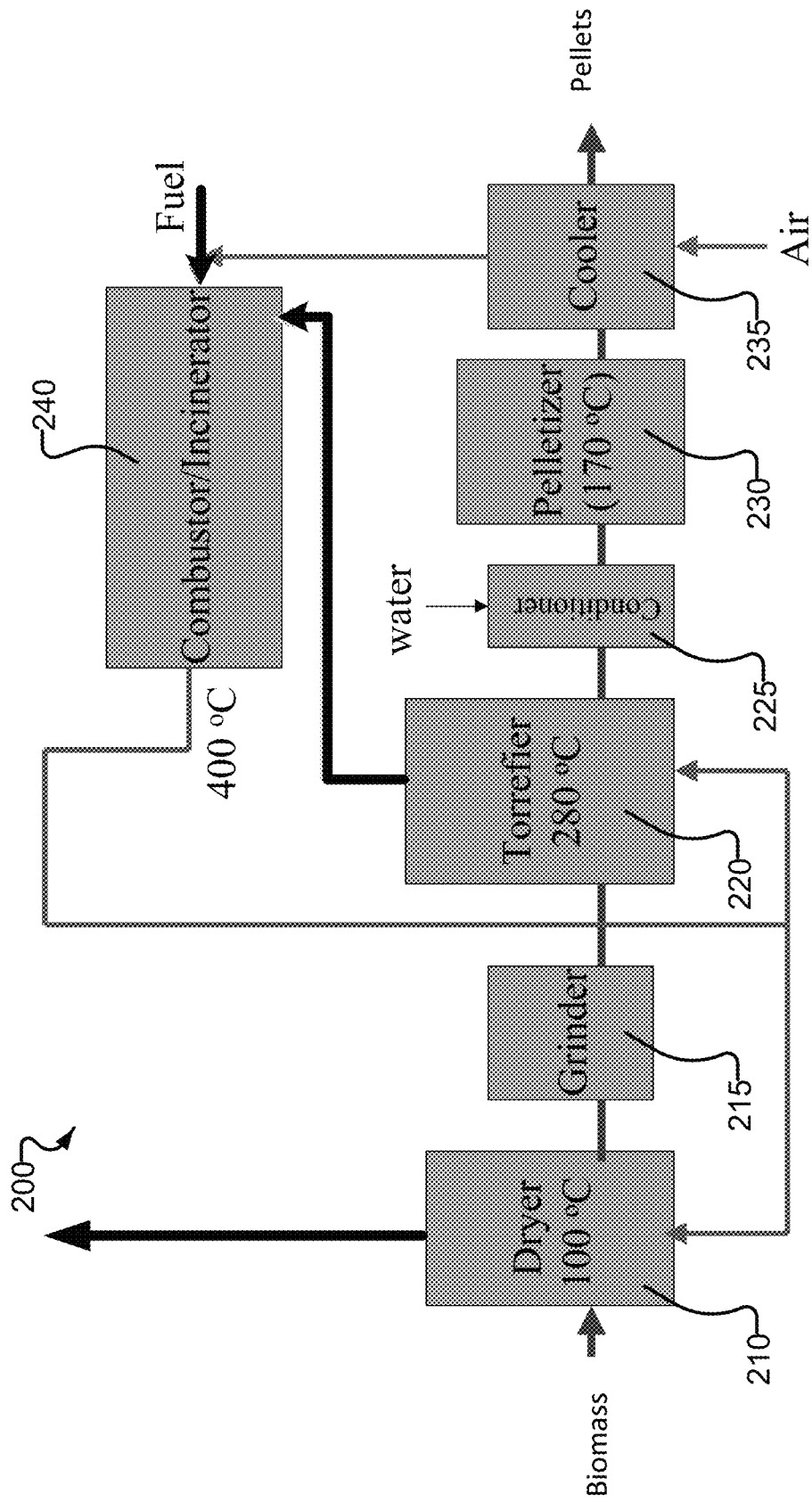
FIG. 9 is a schematic diagram of a system for processing biomass according to an exemplary embodiment of the invention.

FIG. 8B depicts an exemplary lower boundary and an exemplary upper boundary of the temperature of a particle 5 as a function of the distance it has travelled through vessel 22 in first direction 12 for the case where the reactor 20 with magnetrons (e.g. a reactor with a second zone 48B). The FIG. 8B heating rate could be employed for pyrolysis of particles 5. In FIG. 8B, it can be seen that the temperature of particles 5 rises relatively quickly in a first portion of first zone 48A before it plateaus. Similarly, the temperature of particles 5 rises relatively linearly in a first portion of second zone 48B before plateauing. In some embodiments, the rate of heating in the first portion of second zone 48B is higher than the rate of heating in the first portion of first zone 48A. This may be caused by the energy added by magnetrons 34 in second zone 48B.

In some embodiments, method 100 produces one or more outputs 6. Outputs 6 may include bio char, bio oil, one or more gases or vapours comprising carbon monoxide and or hydrocarbons or bio-oil vapours, catalyst materials, microwave absorbent materials, etc., Some of outputs 6 (e.g. solid and liquid outputs 6) may exit chamber 23 through outlet 26 while other outputs (e.g. gas or vapour outputs 6) may exit chamber through outlet 32.

In some embodiments, it may be desirable to increase the ratio of polymer particles to biomass particles in the composition of particles 5 to achieve higher quality outputs 6. For example, in some cases, it may be possible to improve the quality of bio oil and/or bio oil vapours produced through method 100 by increasing the ratio of polymer particles to biomass particles in the composition of particles 5.

In some embodiments, one or more pressure sensors, such as but not limited to pressure transducers, may be provided in chamber 23 to monitor the pressure in one or more regions of chamber 23. In some embodiments, a pressure sensor is provided for each of one or more regions (e.g. first region 23A, second region 23B, etc.) of chamber 23. By monitoring the pressure in chamber 23, it may be possible to determine whether particles 5 are sufficiently fluidized. For example, pressure sensors may be employed to monitor for "bubbling" of particles 5 in one or more regions of chamber 23. If particles 5 are not sufficiently fluidized, the flow rate of fluidization medium 7 may be increased. Alternatively or additionally, a frequency of delivery of bursts of fluidization medium 7 may be decreased.

Another aspect of the invention provides systems for processing biomass. Such systems may be employed for pyrolysis or torrefaction of biomass. System 200 is a non-limiting example of a system for processing particles 5 that incorporates reactor 20.

System 200 may comprise a dryer 210, a grinder 215, a reactor 220, a conditioner 225, a pelletizer 230, a cooler 235 and a combustor/incinerator 240. Reactor 200 may be substantially similar to reactor 20 or any other reactor described herein.

Raw or substantially raw biomass may be dried in dryer 210. Dryer 210 may comprise, for example a rotary dryer, a moving bed dryer or a fluidized/spouted bed dryer.

After being dried in dryer 210, the biomass may be ground into desirably sized particles in grinder 215. Grinder 215 may comprise, for example, a hammer mill or a knife mill, depending on the types of biomass being processed by system 200. In some embodiments, the biomass is reduced to particles 5 having particles of similar size to sawdust (e.g. in the range of about 0.1 mm to about 3 mm). In some embodiments, it may be desirable to achieve particles 5 having a relatively narrow particle size distribution to avoid having larger particles that sink to the bottom of bed 25 and move more slowly than desirable through reactor 200.

After being reduced in size by grinder 215, particles 5 may be processed by reactor 220 (e.g. pyrolyzed or torrefied) according to method 100 herein or otherwise.

The torrefied biomass may then be conditioned by conditioner 225 to adjust moisture content as desired (e.g. by adding water and/or water vapour) and/or to add any binders if desired. In some embodiments, conditioner 225 may be employed to achieve a moisture content of between about 10% and 20% (by weight).

A pelletizer 230 may be provided to compress the conditioned torrefied biomass into torrefied pellets which are then cooled in cooler 235.

A combustor/incinerator 240 may be provided to burn gaseous or condensed output fluid output 6 of reactor 200 and/or additional biomass fuels to provide hot flue gases. The hot flue gases may be provided to dryer 210 and/or used as fluidization medium 7 for reactor 200.

For example, bio-oil vapours outputted from reactor 200 may be combusted in combustor/incinerator 240 to provide hot flue gases for dryer 210 and/or fluidization medium 7 for reactor 200. In some embodiments, combustor 240 comprises a catalytic combustor for burning fluid output 6 from torrefaction in reactor 200 at approximately 500° C. In some embodiments, one or more cyclones or filters are provided to remove solid particles from fluid output 6.

In a non-limiting example application of the apparatus and methods, the particles treated are biomass such as wood. The wood is comminuted into small particles that are reasonable uniform in size and, if necessary, dried to have a water content of between about 10% and 20% (by weight), or less.

The wood particles are then fed into a reactor 20 as described herein wherein they form a shallow fluidized bed 25 as a result of upwardly directed burst of heated fluidizing medium (e.g. gas). The wood particles travel on average in a horizontal direction from inlet 24 to outlet 26 during which time their temperature rises. As they travel along the fluidized bed, the particles become torrefied, or if temperature inside chamber 23 is sufficiently high, the particles become pyrolyzed.

As the wood particles travel along fluidized bed 25, the particles may pass through zones in which fluidizing medium is delivered at different times such that a top surface of the fluidized bed forms waves that travel along fluidized bed 25 (for example, in a direction from inlet 24 to outlet 26).

The heated wood particles emit volatile compounds such as bio-oil vapours and produce, for example, bio char. The bio-oil vapours may be collected at fluid outlet 32. The collected gases and/or vapours may be condensed to yield valuable bio-oils.

In another example, the wood particles are mixed with polymer particles such as particles of rubber, plastic etc. In such embodiments, the polymer particles may be volatized by heat in chamber 23 to yield, for example, oil, monomers. The products may be collected with the bio char and/or bio-oil.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Where the terms "adjacent" or "spaced apart" are used herein, it should be understood that the items described as being "adjacent" to one another or "spaced apart" from one another may or may not be abutting.

Where any range is described herein, the description includes all sub-ranges and combinations of sub-ranges and individual values belonging to the described range. For example the description of a range from about 300° C. to about 650° C. also describes, without limitation, the sub-range of about 325° C. to about 375° C. and also describes the sub-range of 500° C. to 600° C. and also describes each of the specific temperatures in the range such as 295° C. (which is included in "about 300° C."), 300° C., 301° C., ... 347° C., ... 650° C., ... 656° C. (which is included in "about 600° C."). As another example, a description of a range of between 10% and 30% also describes, without limitation, the sub-ranges 10% to 17% and 14% to 30% and 21% to 27% as well as all individual values in the described range such as 22%, 29% etc.

While a number of exemplary aspects and embodiments have been discussed above, those of skill in the art will

The invention claimed is:

1. A fluidized bed reactor for biomass treatment comprising:
    a vessel defining a chamber extending continuously and uninterrupted in a first direction from a first end to a second end;
    an inlet at the first end of the vessel for feeding particles into the vessel;
    an outlet at the second end of the vessel for outputting processed particles;
    a first fluid inlet independently activatable to deliver a first volume of a gas in a second direction into a first region of the chamber;
    a second fluid inlet spaced apart from the first fluid inlet in the first direction and independently activatable to deliver a second volume of the gas in the second direction into a second region of the chamber, the second region adjacent the first region; and
    wherein the first direction is non-parallel to the second direction.

2. A fluidized bed reactor according to claim 1 wherein the first direction is orthogonal to the second direction.

3. A fluidized bed reactor according to claim 1 comprising a heater to heat the first volume of the gas and the second volume of the gas.

4. A fluidized bed reactor according to claim 3 wherein the heater heats the first volume of the gas to a temperature, $T_1$, and the second volume of the gas to a temperature, $T_2$, wherein $T_2$ is greater than $T_1$.

5. A fluidized bed reactor according to claim 3 wherein the heater heats the first volume of the gas to a temperature, $T_1$, and the second volume of the gas to a temperature, $T_2$, wherein $T_2$ is approximately equal to $T_1$.

6. A fluidized bed reactor according to claim 1 wherein the chamber is divided into a first zone and a second zone and wherein one or more magnetrons are arranged to deliver microwaves in the second zone.

7. A fluidized bed reactor according to claim 6 wherein the vessel comprises one or more windows through which the one or more magnetrons deliver the microwaves into the second zone.

8. A fluidized bed reactor according to claim 1 wherein a bottom wall of the vessel is perforated to allow gas delivered by the first fluid inlet and the second fluid inlet to pass through perforations in the bottom wall into the chamber while preventing particles from passing through the perforations.

9. A fluidized bed reactor according to claim 1 comprising:
    a third fluid inlet spaced apart from the second fluid inlet in the first direction and independently activatable to deliver a third volume of the gas in the second direction into a third region of the chamber, the third region adjacent the second region;
    a fourth fluid inlet spaced apart from the third fluid inlet in the first direction and independently activatable to deliver a fourth volume of the gas in the second direction into a fourth region of the chamber, the fourth region adjacent the third region; and
    a fifth fluid inlet spaced apart from the fourth fluid inlet in the first direction and independently activatable to deliver a fifth volume of the gas in the second direction into a fifth region of the chamber, the fifth region adjacent the fourth region.

10. A fluidized bed reactor according to claim 1 comprising a pressurized fluid source.

11. A fluidized bed reactor according to claim 10 wherein the first fluid inlet comprises a first piston selectively operable to open a first seal between the pressurized fluid source and the vessel to thereby deliver the first volume of the gas in the second direction into the first region of the chamber.

12. A fluidized bed reactor according to claim 11 wherein the second fluid inlet comprises a second piston selectively operable to open a second seal between the pressurized fluid source and the vessel to thereby deliver the second volume of the gas in the second direction into the second region of the chamber.

13. A fluidized bed reactor according to claim 1 comprising one or more direct heaters for heating the particles.

14. A fluidized bed reactor according to claim 1 wherein the first direction is within 20° of a substantially horizontal direction.

15. A system for processing biomass, the system comprising:
    a dryer for drying raw biomass;
    a grinder for making biomass particles from dried biomass;
    a fluidized bed reactor according to claim 1 for processing the biomass particles;
    a conditioner for adjusting a humidity of processed biomass received from the fluidized bed reactor;
    a pelletizer for fabricating biomass pellets out of processed biomass received from the conditioner; and
    a cooler for reducing the temperature of the biomass pellets.

16. A system according to claim 15 wherein off-gasses from the fluidized bed reactor are combusted to heat the raw biomass in the dryer.

17. A system according to claim 15 wherein off-gasses from the fluidized bed reactor are combusted to heat the biomass particles in the fluidized bed reactor.

18. A fluidized bed reactor according to claim 1 wherein a first direction length of the chamber between the first and second ends is at least five times greater than a second direction height of the chamber in the first region.

19. A fluidized bed reactor according to claim 1 wherein the first volume of the gas is delivered into the chamber through a first plenum chamber and the second volume of the gas is delivered into the chamber through a second plenum chamber and the first and second plenum chambers are spaced apart and separated from one another.

20. A fluidized bed reactor according to claim 1 comprising a single fluid source for providing the first volume of the gas and the second volume of the gas.

21. A fluidized bed reactor according to claim 1 wherein first and second sidewalls of the vessel extend in the first direction and are each sloped downward toward one another.

22. A fluidized bed reactor according to claim 1 comprising a vibrating apparatus for vibrating the vessel.

23. A fluidized bed reactor according to claim 1 wherein the first direction is a substantially horizontal direction.

* * * * *